(12) United States Patent
Welch et al.

(10) Patent No.: US 10,623,609 B1
(45) Date of Patent: *Apr. 14, 2020

(54) VIRTUAL VIDEO ENVIRONMENT DISPLAY SYSTEMS

(71) Applicants: Andrew Welch, Los Angeles, CA (US); Larry Uichanco, Westlake Village, CA (US)

(72) Inventors: Andrew Welch, Los Angeles, CA (US); Larry Uichanco, Westlake Village, CA (US)

(73) Assignee: VE VIRTUAL ENVIRONMENT LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,626

(22) Filed: Oct. 26, 2018

Related U.S. Application Data

(63) Continuation of application No. 16/003,648, filed on Jun. 8, 2018.

(60) Provisional application No. 62/611,362, filed on Dec. 28, 2017, provisional application No. 62/561,594, filed on Sep. 21, 2017, provisional application No. 62/517,054, filed on Jun. 8, 2017.

(51) Int. Cl.
*H04N 5/04* (2006.01)
*H04N 5/445* (2011.01)
*G06F 3/14* (2006.01)
*G06F 3/042* (2006.01)

(52) U.S. Cl.
CPC .............. *H04N 5/04* (2013.01); *G06F 3/1446* (2013.01); *H04N 5/44504* (2013.01); *G06F 3/0421* (2013.01)

(58) Field of Classification Search
CPC .... H04N 5/04; H04N 5/44504; G06F 3/1446; G06F 3/0421
USPC .......................................................... 348/383
See application file for complete search history.

(56) References Cited

U.S. PATENT DOCUMENTS

| | | | |
|---|---|---|---|
| 7,262,746 B2 * | 8/2007 | Lagarrigue | H04N 7/0806 345/1.3 |
| 10,324,299 B2 | 6/2019 | Lee | |
| 2002/0141732 A1 * | 10/2002 | Reese | H04N 5/765 386/223 |

(Continued)

*Primary Examiner* — Michael Lee
(74) *Attorney, Agent, or Firm* — Womble Bond Dickinson (US) LLP

(57) ABSTRACT

Systems enable viewing of video images over a plurality of scalable modular video displays include a video wallpaper subsystem and a video central computer subsystem. The video wallpaper has video displays having a same pixel pitch, and a width and height. The video displays include a video scaler and video mixer configured to enable video signals provided to the video displays to appear as one of a single video image a plurality of separate video images. Each of the video images appearing on a subset of the video displays as an overlay over the single video image, wherein the single video image and each of the plurality of separate video images are displayed at predetermined resolutions. The video central computer subsystem includes a video processing unit which receives video signals from a plurality of video sources and selects video signals to process and send to the video displays and includes a synchronizing frame buffer with time base correction to provide video synchronization of the selected video signals.

8 Claims, 24 Drawing Sheets

(56) References Cited

U.S. PATENT DOCUMENTS

| | | | |
|---|---|---|---|
| 2003/0076278 A1* | 4/2003 | Choi | G06F 3/1438 345/1.1 |
| 2005/0174482 A1* | 8/2005 | Yamada | H04N 9/12 348/383 |
| 2006/0028398 A1* | 2/2006 | Willmore | G06F 3/14 345/2.3 |
| 2009/0237560 A1* | 9/2009 | Ganzaroli | H04N 5/04 348/511 |
| 2010/0117929 A1* | 5/2010 | Fujimori | G06F 3/1446 345/1.3 |
| 2015/0145892 A1* | 5/2015 | Hong | G06F 3/1446 345/649 |
| 2018/0357033 A1* | 12/2018 | Welch | G06F 3/1446 |

\* cited by examiner

VIRTUAL VIDEO ENVIRONMENT DISPLAY SYSTEMS

CROSS-REFERENCE TO RELATED APPLICATIONS

This application claims the benefit of U.S. Provisional Application No. 62/517,054 filed on Jun. 8, 2017, U.S. Provisional Application No. 62/561,594 filed on Sep. 21, 2017, and U.S. Provisional Application No. 62/611,362 filed on Dec. 28, 2017, the entire contents of each are hereby incorporated by reference

TECHNICAL FIELD

The disclosed embodiments relate generally to providing synchronized operation of video wall panels

BACKGROUND

Modern computing and display technologies provide increasing realism to virtual environments. These displays can include a variety of display technologies to provide displays of different sizes to meet the needs of a user or environment. Increasing technologies and consumer desires further create demand for larger and better display technologies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
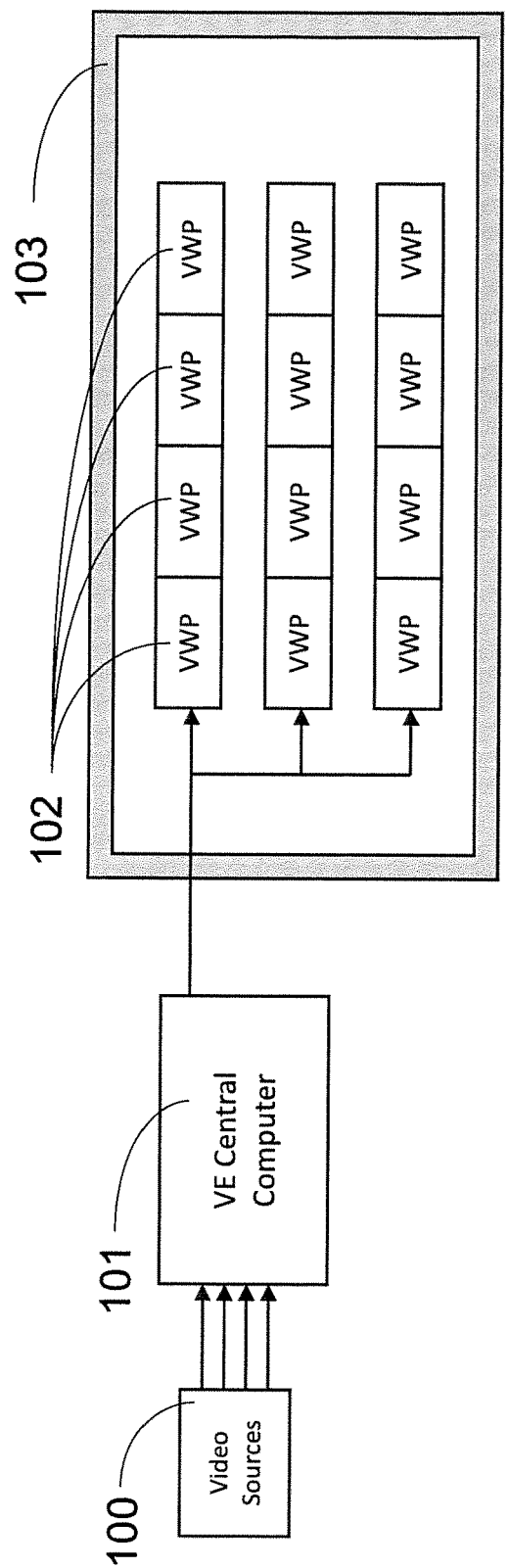
FIG. 1 is a schematic diagram of an embodiment of systems to provide a virtual environment, which can be used in accordance with some aspects of the disclosure.

Disclosed systems and method provide a virtual video environment using high resolution and scalable video. Systems provide for display in natural environments that include segments blocked by architectural elements. For example, the display may be segmented to provide immersive experiences while maintaining utility of windows and doors. In some embodiments, emissive video hardware technology is used with modular diagonal display panels and nano-infrared technology to create interactive resolution video displays while avoiding visible seams. This enables overlay placement of a variety of forms and resolutions of video content over top of any home and commercial walls at the highest resolution, allowing for total audio and video immersion that completely surrounds a user creating a virtual environment.

For years humans have dreamed of having the ability to control their environment. Science fiction has imagined the projected interactive images on walls that are now becoming closer to a reality. Virtual video environment systems as describe herein provide control of audio and video environment of a user's environment.

The advent of affordable computers paired with access to the internet was the start of a data revolution in the 1990's. Display technology also offers high resolution flat screens that can provide high resolution video for different sized video screens. Many display screens may be based on based on LCD-LED (liquid crystal display) such as, LED TVs, SURD TVs, Super UHD TVs, Quantum Dot LED TVs (QLED), or the like. Although LCD's can be used for larger displays, they have an inherit issue with limited viewing angles and contrast. LCD based display screens use transmissive technology with a back light to illuminate pixels. This may limit the viewing angle, since the light is not transmitted at a full 180° angle. Accordingly, viewing the display from a side angle provides a darker image than viewing from a front angle. Furthermore, backlighting the display can reduce the black levels available and therefore reduce the contrast experienced for the display. Therefore, in some embodiments, virtual video environments systems as described herein may use emissive technologies to improve viewing across a large area such as an entire wall. For example, virtual video environments systems may use micro-LED or Organic LED (OLED) technologies. These can include pixels that emit light and color illumination without an LED backlight. Accordingly, the virtual video environments systems can include display screens that can be viewed similarly from any angle as a user moves in a room. These may also provide better contrast, more consistent viewing, and be better suited for a video wall that may be viewed from different angles and multiple users.

In some embodiments, the virtual video environments systems may provide multiple sizes of display screens to increase installation flexibility. For example, a first size display screen can be used to fill in a majority of a video wall. However, due to natural obstructions such as doors, windows, or other features, there may be significant gaps between the edges of the display screens and those obstructions. Accordingly, a second size display screen can be used as well that is smaller and can fill in those gaps. In some embodiments, additional sizes of display screens can also be used.

In some embodiments, the virtual video environments systems can also provide high resolution video overlays to be displayed simultaneously over a video wall. The overlay videos may be displayed according to an order set by a user. For example, a bottom layer overlay may be set as a background layer to take up a whole wall or room of a virtual environment. Next layers may show video provided from a variety of sources including streaming sources, cable video feeds, video players, laptops or other personal computers, or the like. There may also be a top layer video overlay that provides a user interface for a user to configure such virtual environments. In some embodiments, the user interface may be a touch system integrated with the modular displays to allow direct interaction with the virtual environment. The touch system detects the user's touch of the display panels and enables interaction with the display panels. In some embodiments, additional control systems such as gesture based, audio based (via microphone or separate audio instruction system), such as voice commands, or remote control based may be used for user interaction with the virtual environment.

FIG. 1 shows an example system of a virtual video environment system that provides video to a number of video wall panels 102 from a virtual environment central computer 101. The video may be provided to the wall panels 102 from a number of video sources 100. In some embodiments, the system includes a virtual touch screen interface 103 that identifies and interprets one or more touch commands from a user to control the virtual environment. The touch screen interface subsystem 103 can include a plurality of sensors and corresponding receivers arranged over a surface of the virtual environment wall panels 102. The touch screen interface 103 is disposed over vertical and horizontal axes of the video wallpaper to form a grid pattern of beams across a surface of said video wallpaper subsystem. The pattern of beams is then interruptible by an object disposed on or adjacent to the surface. In some embodiments, other types of touch screen sensors, such as capacitive touch sensors, resistive touch sensors, or other types of touch sensors may form a grid about the virtual wallpaper to provide interactive touch interface to a user. As shown in FIG. 1, the virtual environment central computer 101 can communicate to virtual wall panels 102 through a serial digital interface. In some embodiments, the virtual environment central computer 101 may communicate to the virtual wall panels 102 through a network interface. For example, the virtual environment central computer 101 can communicate to the virtual wall panels 102 through an Ethernet interface, an HDMI interface, or other connections.

Figure 2:
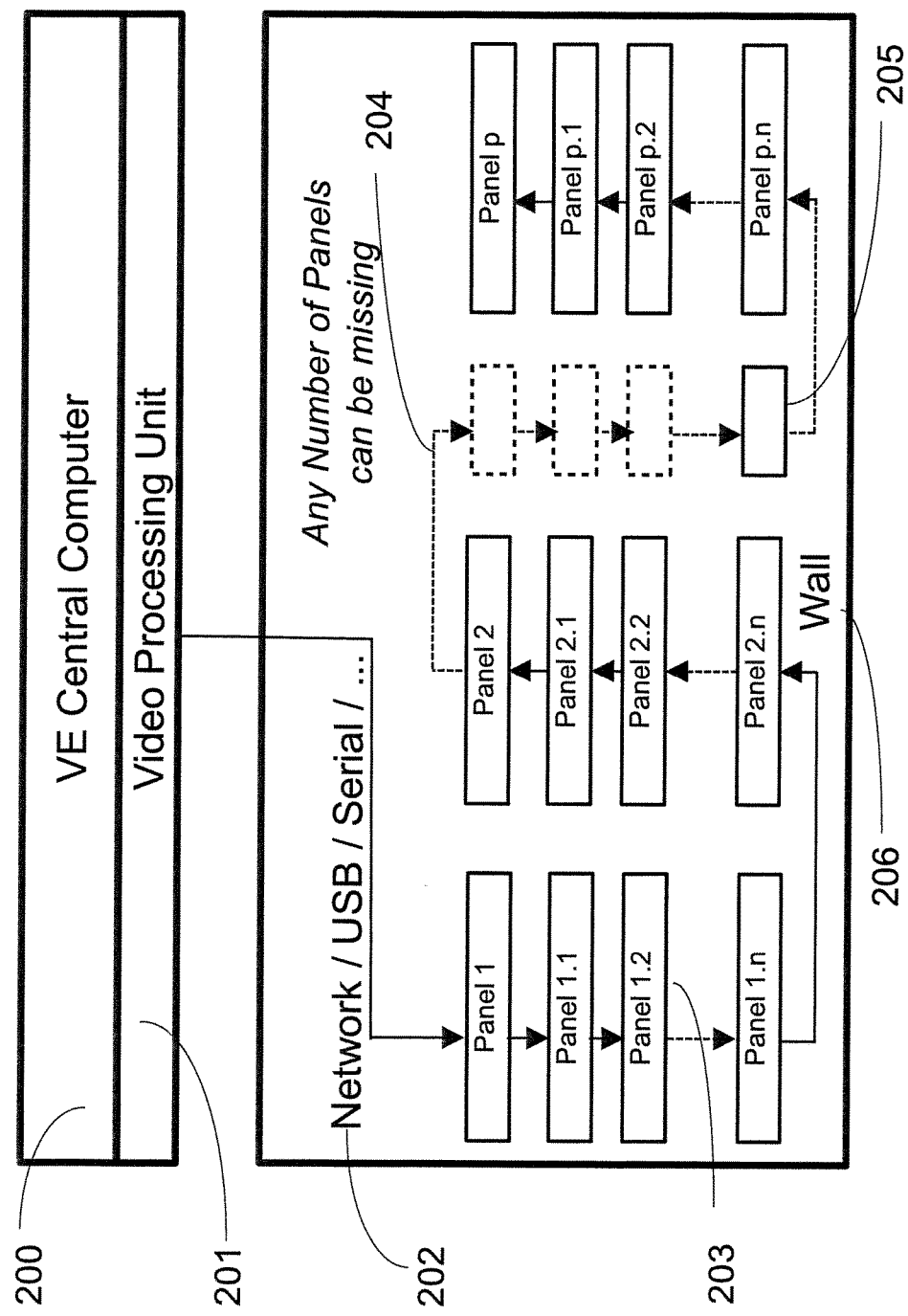
FIG. 2 is a schematic diagram of an embodiment of systems to provide a virtual environment, which can be used in accordance with some aspects of the disclosure.

The virtual environment central computer 101 distributes video overlays to the virtual wall panels using a serial digital interface. In some embodiments, other interfaces may be used, such as a network connection, a parallel digital interface, or other interfaces. FIG. 2 shows example processes of communications between a virtual environment central computer 200, video processing unit 201, and a variety of virtual wall panels. The virtual environment central computer 200 and video processing unit 201 can provide processing to generate graphical user interfaces, background video, removable digital media playback, network connection 202 and processing including Ethernet, WiFi, Bluetooth, or the like. These connections can provide processing for a user interface on a separate user device to enable a user to change settings and playback options as well as enable a user to play a video from a user device.

The virtual environment central computer 200 can provide control over and processing of video sources to provide an overlay to virtual wall panels 203. A base overlay may be used as a background image for the virtual environment. For example, a background image or video can be provided that covers the entire wall. The virtual environment central computer 200 can also provide additional overlays for the virtual environment. For example, a first overlay may provide a user interface and additional overlays can be used to display user videos from one or more video sources. The virtual environment central computer 200 may also provide positions, size, transparency levels, and other features for each of the overlays. The virtual environment central computer 200 may communicate with the virtual wall panels 203 through a wired or wireless connection 202.

Because of the modular nature of the virtual environment, the virtual environment central computer 200 may provide configuration setup to ensure that the virtual wall panels are properly configured. The virtual processing unit 201 and virtual environment central computer 200 may communicate to ensure that the number, version, size, network configuration, or the like are properly installed on each device. The virtual environment central computer 200 may also provide an indication to each virtual wall panel 203 indicating which overlay to provide on the screen, an offset for the overlay, and other information to enable display of the overlay on one or more virtual wall panels 203.

Figure 3:
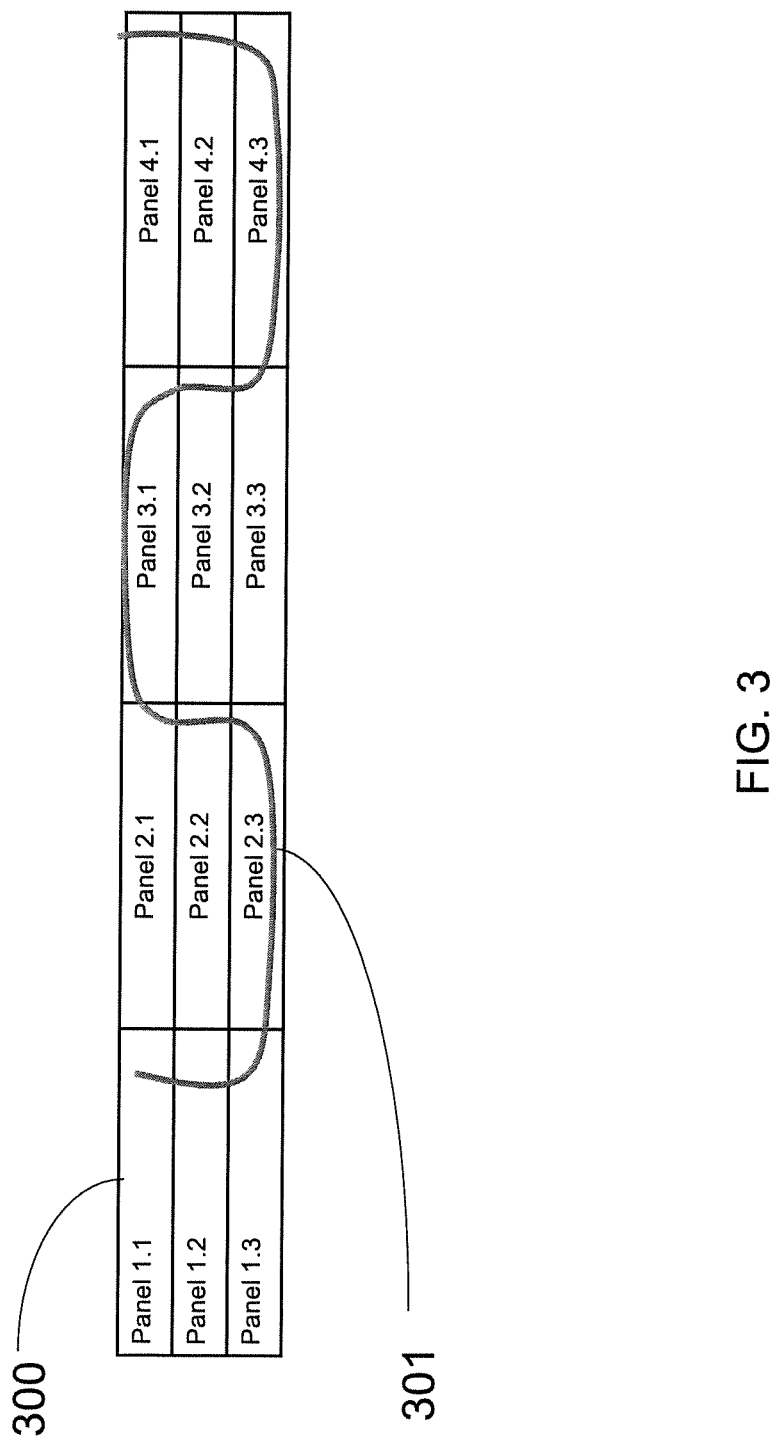
FIG. 3 is a schematic diagram of an embodiment of display panels to provide a virtual environment, which can be used in accordance with some aspects of the disclosure.

In some embodiments, the virtual environment central computer 200 also sets up a configuration of virtual wall panels. For example, a display grid 301 of virtual wall panels 300 is shown in FIG. 3. As shown, the virtual wall panels 300 have a serpentine connection that enables communication between the virtual wall panels 301. The virtual environment central computer 200 can configure the display grid 301 based on the size or shape of a virtual environment. For example, this can include adding or removing virtual wall panels depending on a room configuration.

Figure 4:
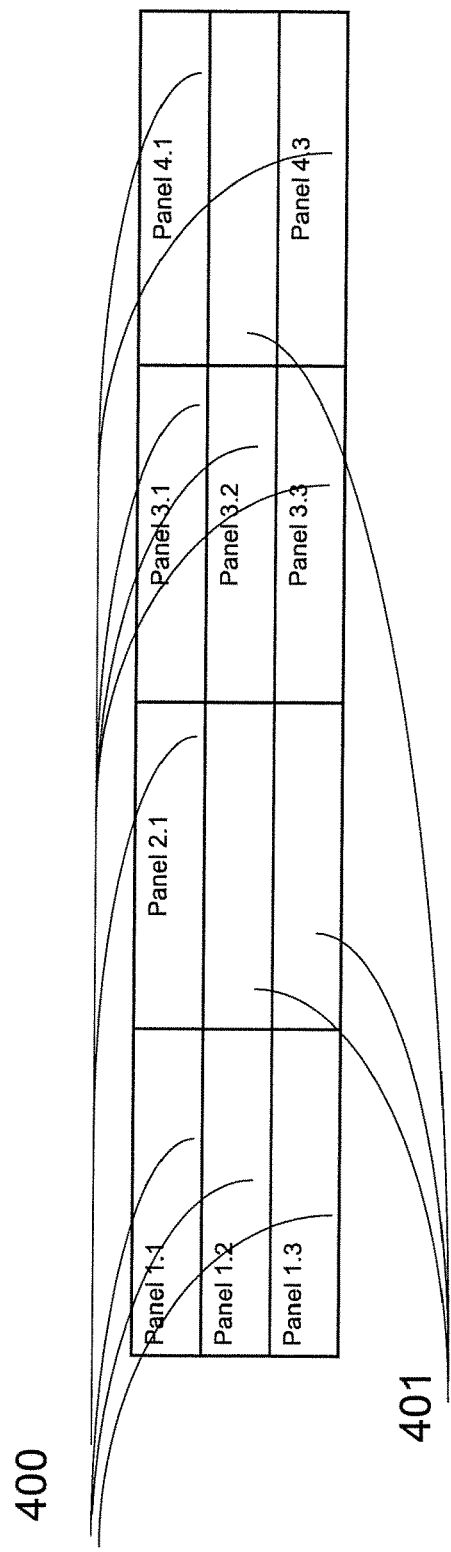
FIG. 4 is a schematic diagram of an embodiment of display panels to provide a virtual environment, which can be used in accordance with some aspects of the disclosure.

For example, as shown in FIG. 4, there may be missing wall panels 401. These may be missing to make room for doors, windows, or other environmental obstructions. Accordingly, the virtual environment central computer 200 may remove those panels from the configuration of the setup. In some embodiment, an administrator may provide instructions to the virtual environment central computer 200 in order to ensure proper setup. In some embodiments, the virtual environment central computer 200 may detect the location of the virtual wall panels 400 and missing virtual wall panels 401 based on connections between the virtual wall panels 400. For example, the virtual wall panels 400 may have connections that enable them to communicate with nearby virtual wall panels 400 and provide an indication of relative position.

From the serpentine example above, panels 5 and 6 could be at a door location, and panel 11 at a window location. After removing those 3 panels, the new configuration can be seen in FIG. 4. Panels may be restored to a configuration if removed improperly or later added. In order to verify that things are working as expected, the virtual environment central computer generates a background that corresponds to the grid shown in the settings. That background includes an image and numbers written on top. That way the technician can quickly and easily see whether the image is broken and if so adjust the parameters as required.

Figure 5:
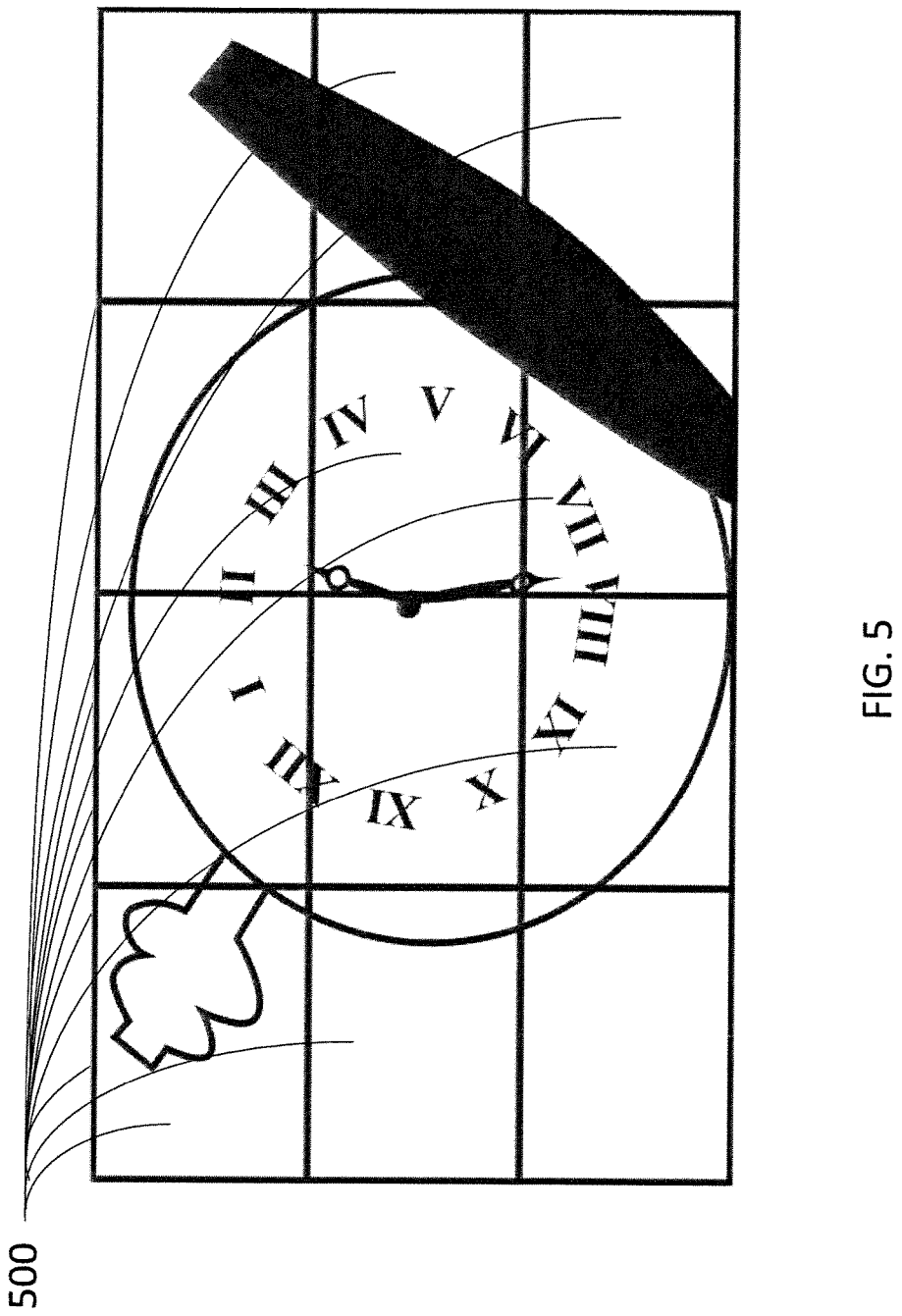
FIG. 5 is a schematic diagram of an embodiment of display panels to provide a virtual environment, which can be used in accordance with some aspects of the disclosure.
Figure 6:
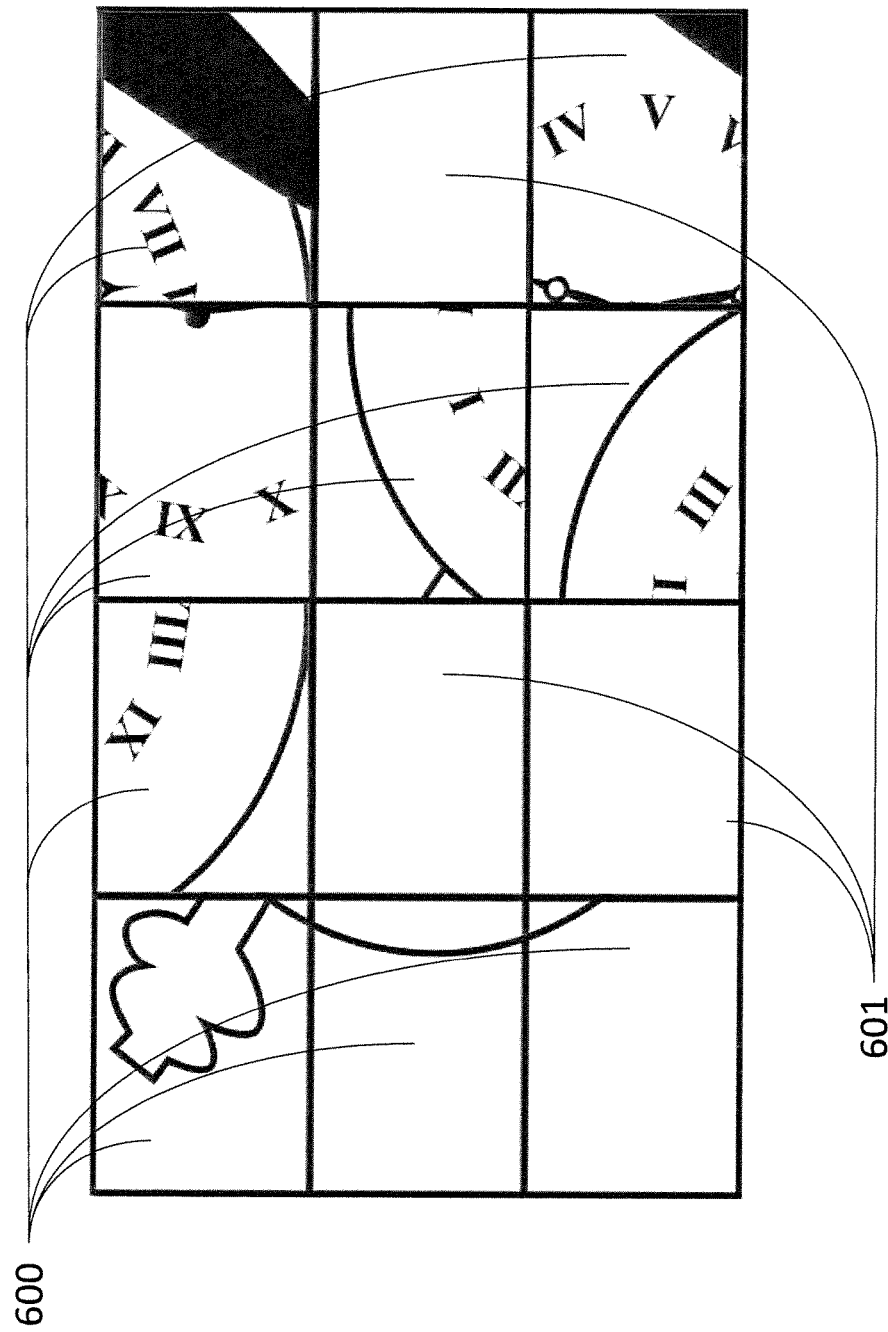
FIG. 6 is a schematic diagram of an embodiment of display panels to provide a virtual environment, which can be used in accordance with some aspects of the disclosure.
Figure 7:
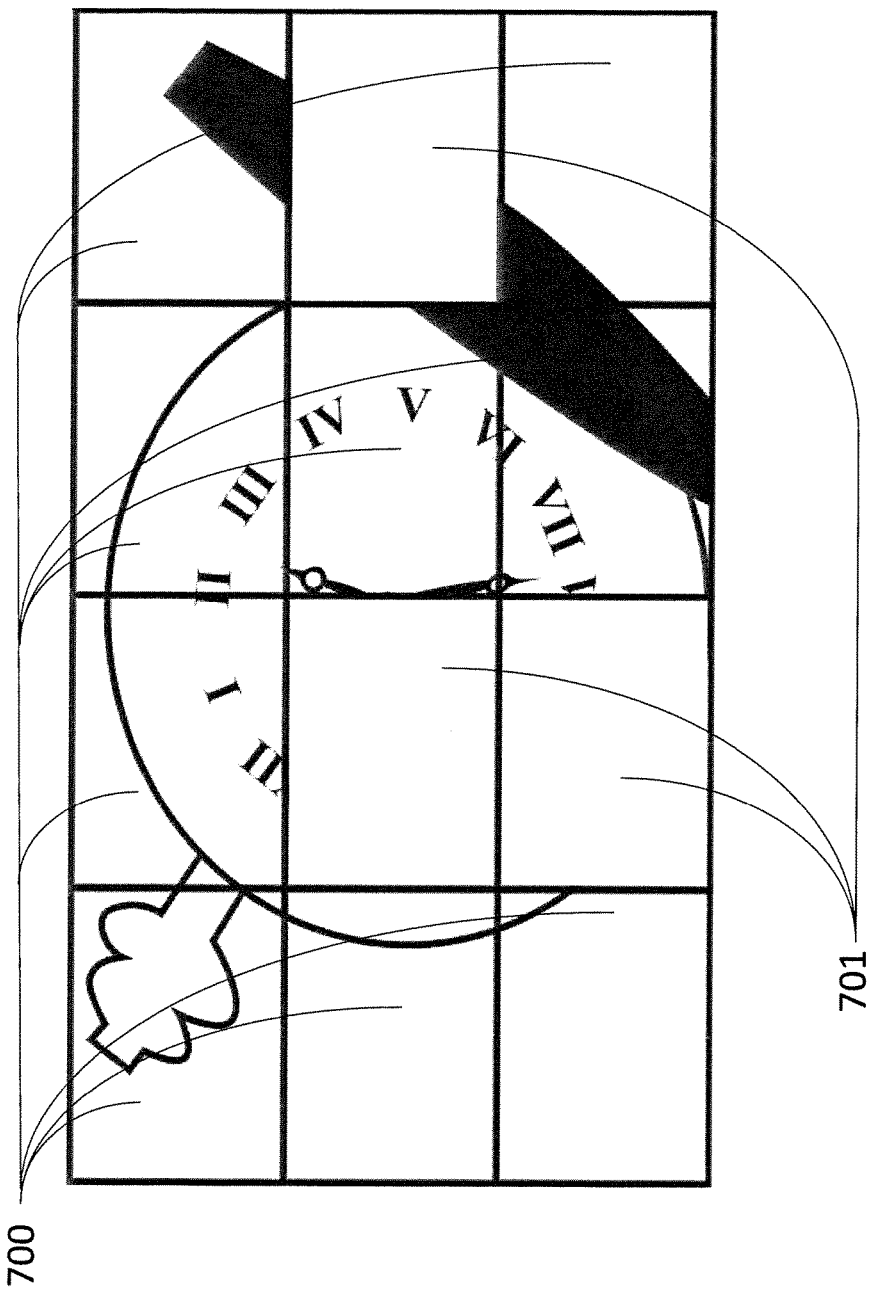
FIG. 7 is a schematic diagram of an embodiment of display panels to provide a virtual environment, which can be used in accordance with some aspects of the disclosure.

FIG. 5 is an example of a pocket clock and a 4×3 serpentine setup with all the panels installed. The clock shows up properly 500. FIG. 6 shows an example of a pocket clock on an improperly installed setup because of an existence of a door or window. FIG. 6 shows how the clock looks like when the technician removes certain panels 601 from the system configuration for virtual environment. The numbers shown in FIG. 6 correspond to panel numbers, so these are correct in that picture. The image of the clock shown, however, looks incorrect. FIG. 7 shows the panels after the removed panels 701 are removed from the configuration and the remaining virtual wall panels 700 are configured properly.

Figure 8:
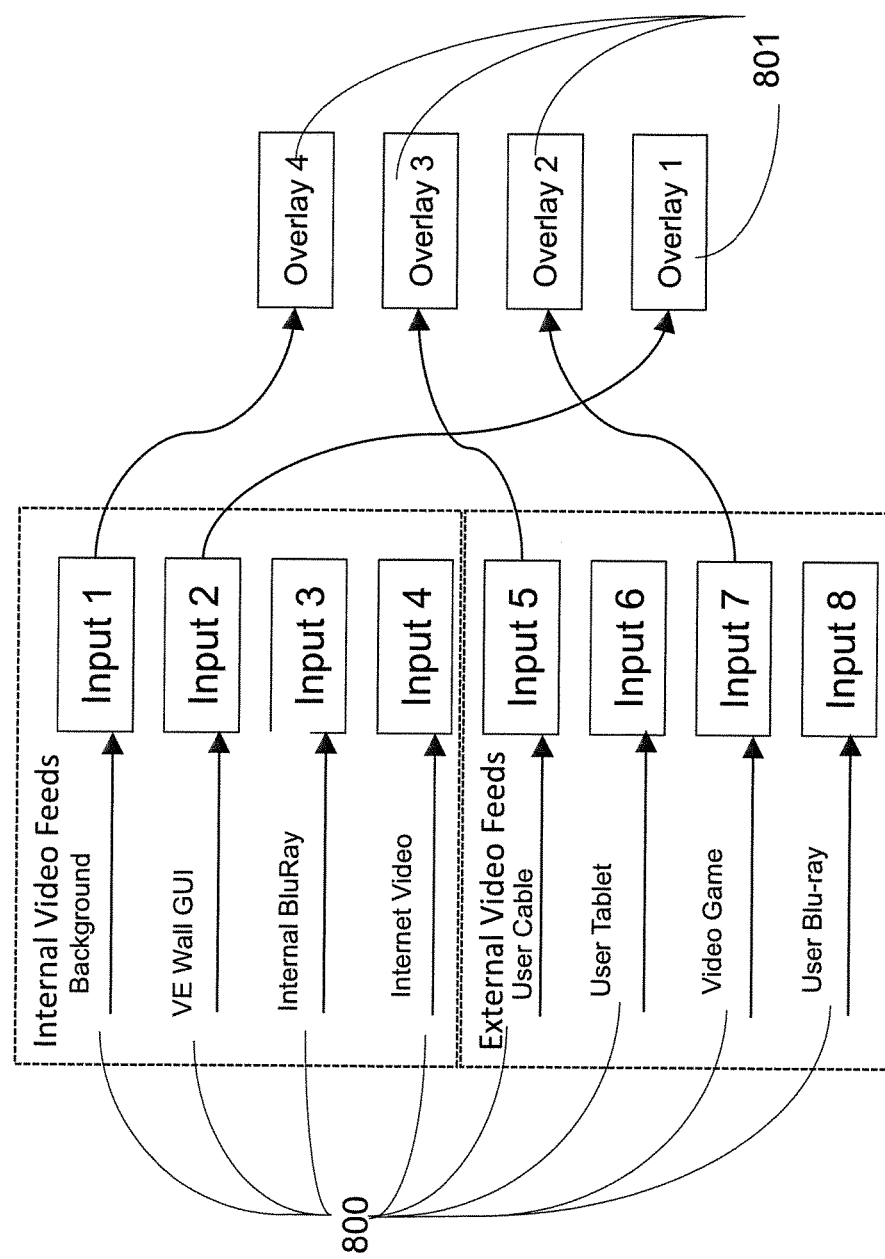
FIG. 8 shows an example of video source assignments to a set of four overlays to provide a virtual environment, which can be used in accordance with some aspects of the disclosure.

In some embodiments, a user may have access to several video input connectors on the 800, including both internal and external video sources. The user can assign various input devices to any of the overlays 801. FIG. 8 shows an example of video source assignments to a set of four overlays. As shown, background input 1 is assigned to overlay 4, the GUI is assigned to overlay 1, and external video feeds are provided to overlays 2 and 3. In various embodiments, there may be fewer or additional overlays 801 than shown in FIG. 8 and fewer or additional video feeds. The settings may also provide the user an option to connect additional video feeds to different overlays. From the settings, the user can select which two of the connected devices are shown on the virtual wall panels. The settings allows for going from one video input to another until the user finds the one he wants to watch.

Figure 9:
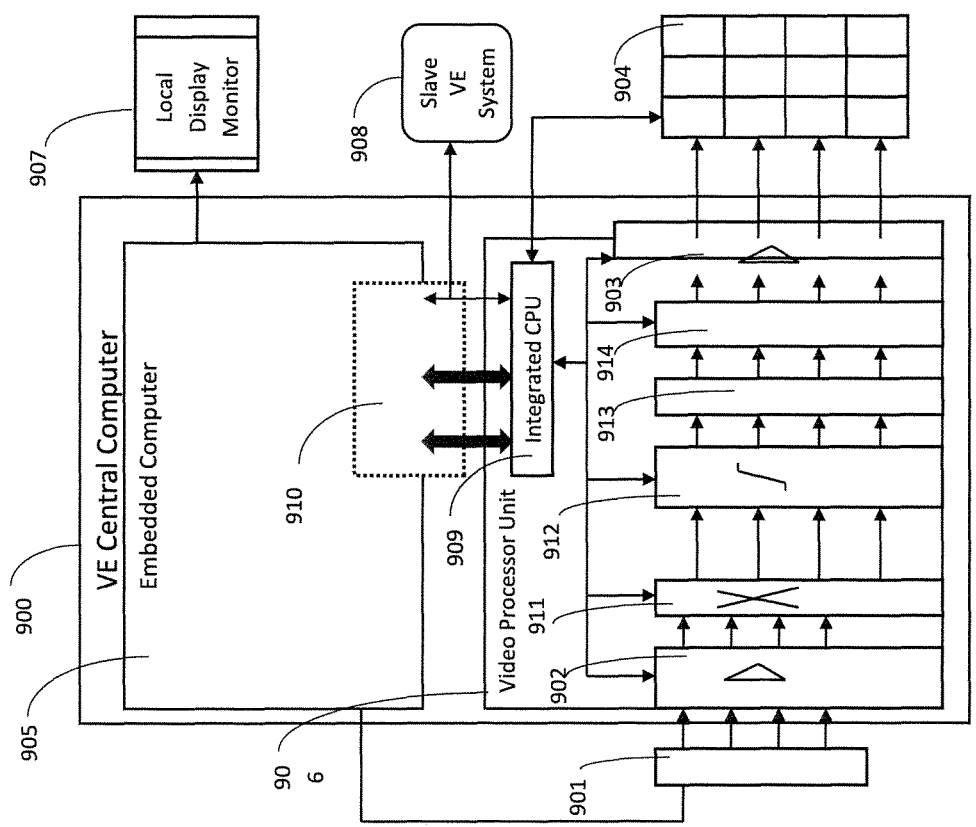
FIG. 9 is a schematic diagram of an embodiment of systems to provide a virtual environment, which can be used in accordance with some aspects of the disclosure.

In some embodiments, the virtual environment central computer 900 uses a real-time Field Programmable Gate Array ("FPGA") to execute the necessary signal processing. Distribution of the video to the virtual wall panels with serial digital interface interconnects can then be performed in a serpentine arrangement. FIG. 9 shows an example virtual central computer 900 including connectors to connect the user's video sources 901. The example virtual central computer 900 has four HDMI input connectors, or other types of input connectors in some embodiments, that may be received as inputs 902. These inputs 902 can be configured to drive any of the overlays of the virtual environment. The virtual environment central computer 900 also has the necessary video outputs 903 to connect to the local virtual wall panels 904. The example virtual environment central computer 900 contains two subsystems the embedded computer 905 and the video processor unit 906.

The embedded computer 905 executes the virtual environment software for system management and configuration. The embedded computer 905 runs a real-time operating system to provide the User's GUI and providing configuration management of all the virtual environment hardware. In some embodiments, the embedded computer 905 graphics card is connected to a local monitor display 907 to view setup and configuration information for the virtual environment. In some embodiments, the embedded computer 905 can include one or more of a CPU a GPU, persistent memory, ephemeral memory, I/O interfaces, or other components to provide user of the embedded computer 905.

The embedded computer 905 may operate to perform configuration management of virtual wall panels 904. For example, after initial installation of the panels, a technician can program the virtual environment based on the configuration of the panels. The configuration includes the number of rows and columns of the panels, missing panels to accommodate doors and windows, Touchscreen calibration parameters, etc. This configuration will be permanently stored in the virtual environment central computer 900. The embedded computer 905 may also address configuration of all installed virtual wall panels 904. For example, the embedded computer 905 may assign a unique ID address to each virtual wall panel 904. The embedded computer 905 individually controls each panel based on user intervention.

The embedded computer 905 may also perform calculation of display window for overlays on all installed panels. The user has full control of the size and position of each video overlay. The embedded computer 905 keeps track of how each overlay spans across multiple panels. The VE Software computes the video pixel and line counts of each overlay for every installed panel. These computed parameters are transferred to all installed panels in real-time during the vertical blanking of video. In some embodiments, the embedded computer 905 performs configuration and control of virtual environment slave computers. For example, in a multi-wall installation, each wall with an installed virtual wall panel 904 has its own virtual environment central computer 900. A master virtual environment central computer 900 then configures each slave virtual environment system 908 through Ethernet or other connection. Accordingly, the embedded computer 905 manages media displayed on master and slave computers as well as assignment of video sources to each overlay.

In some embodiments, the embedded computer 905 also provides compression, decoding, formatting and other information for provided overlays. For example, the embedded computer 905 may provide data to enable decoding, control to size, position, crop, or other aspects to enable overlay within installed virtual wall panels 904.

The embedded computer 905 also provides GUI generation and interaction through a touch system. The user interacts with the displayed GUI by touching the screen and the absolute coordinates of the touch is sent to the virtual environment central computer 900 through standard USB, Ethernet, or other connections. The embedded computer 905 generates the GUI that will be displayed on the top overlay. Graphical icons, visual indicators, and context sensitive text are displayed to efficiently enable users with full software/hardware control of the virtual environment system.

The virtual environment central computer 900 also includes a video processor unit (VPU) 906. In some embodiments, the VPU 906 includes FPGA-based hardware to implement the video signal processing functions necessary for the virtual environment. The VPU 906 contains the physical video interfaces of the virtual environment system. The VPU 906 may include four or more HDMI inputs 902 to connect the user's video sources 901 to the virtual environment. The VPU 906 may include a corresponding number of High-Definition Serial Digital Interface ("HDSDI") video outputs 903 to connect to the local virtual wall panels 904.

An integrated CPU 909 may be integrated within the FPGA and serves as the control manager of the local hardware. This CPU 909 receives its directives from the embedded computer 905 through either of the following computer interfaces 910: PCIe, USB, Gigabit, Ethernet, RS-232/RS422, or the like. Control commands are converted to high-speed serial data (Control Bus) and sent to all display virtual wall panels 904. HDMI interface 902 serves as the physical and electrical HDMI interface to interface to display monitors. In some embodiments, the virtual environment supports up to UHD (3840×2160 pixels) or higher video resolution. A crossbar switch 911 enables the user to assign any overlay video layers to any HDMI inputs. An HDMI to HDSDI Converter 912 enables the VPU 906 to distribute the overlay videos to the local virtual wall panels. Depending on the wall configuration of the room, the video cable length between the video processor and the video wall panels 904 could exceed the limitation of consumer video cables. Accordingly, an HDSDI is a single-ended electrical interface supporting cable lengths up to 50 meters in UHD resolution. This module converts the HDMI electrical interface to HDSDI. A color space converter and decimating filter may be used to convert the HDMI full bandwidth RGB video to the YUV color space used in HDSDI. If a longer interconnect is required, an optional HDSDI to Fiber adapter can be implemented to replace the coaxial cable connection with a fiber optic cable.

A synchronizing frame buffer 913 provides the overlays assigned to four disparate video sources as frame synchronized with each other. Some consumer video equipment does not have Genlock inputs unlike professional video gear. Video synchronization is required for multiple video overlays to be displayed in one monitor or virtual environment video wall. To synchronize all overlays, a synchronizing frame buffer with time base correction is required. A video color processor 914 provides the control of brightness, hue, and saturation. An HDSDI Cable Driver 903 provides a physical/electrical interface to boost the high-speed UHD video signal and allow the use of up to 50 meters of coaxial cable.

Figure 10:
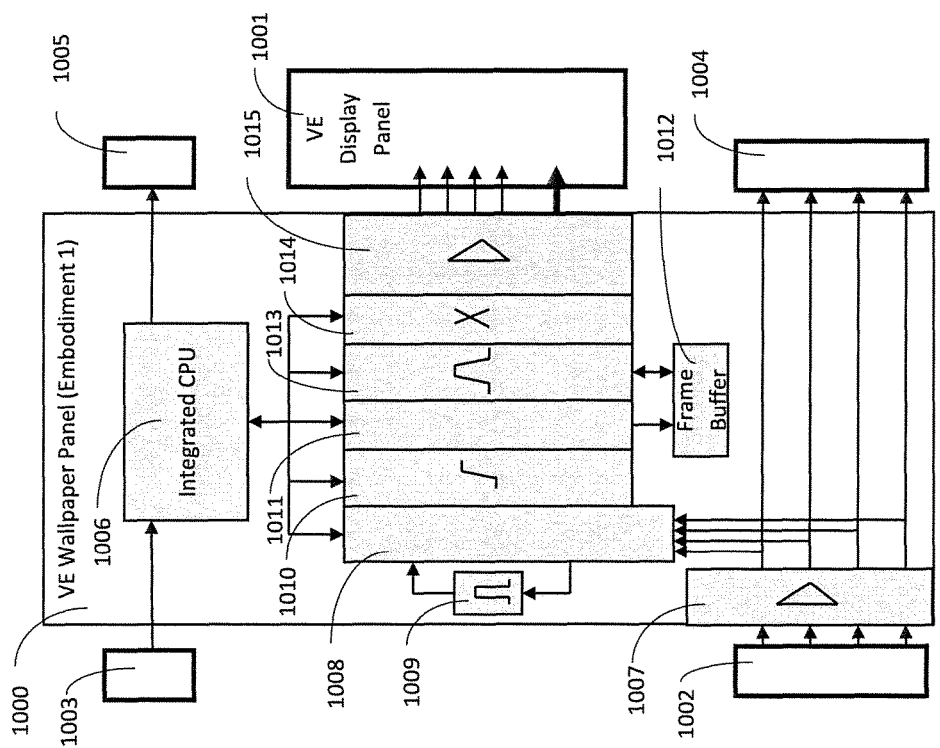
FIG. 10 is a schematic diagram of an embodiment of systems to provide a virtual environment, which can be used in accordance with some aspects of the disclosure.

FIG. 10 depicts a block diagram of an example of hardware on a virtual wall panel 1000. In some embodiments, the virtual wall panel 1000 includes FPGA hardware.

A virtual environment display panel 1001 is integrated, and together with the FPGA Hardware, comprise an entire virtual wall panel 1000. Overlay inputs 1002 and control bus 1003 have active loop through circuitry to allow a serpentine interconnect among other virtual wall panel (not shown).

In some embodiments, the virtual wall panel 1000 contains an integrated CPU 1006 for command and control of the virtual wall panel 1000. An HDSDI cable equalizer with reclocker 1007 will condition the video overlay signal. A format detector and clock generator 1008 will determine the format of the incoming overlay. A phase-locked clock is generated by the VCXO 1009. A YUV to RGB converter 1010 is used to convert the overlay from incoming YUV to full bandwidth RBG, which is supported by the virtual environment display panel 1001. Window overlay timing and address generator 1011 creates the overlay video pixel/line counter. The virtual environment central computer (e.g. virtual environment central computer 900 in FIG. 9) programs the window overlay timing generator so a particular virtual wall panel will know what portion of the overlay will be displayed on its virtual environment display panel. The address generator feeds the frame buffer 1012, which acts as a temporary storage of video for the interpolating/resampling filter 1013. The overlay video mixer 1014 is used to prioritize the display order of the overlays from top layers to bottom layers. The display interface 1015 is the electrical interface for the virtual environment display panel.

The virtual environment display panel 1001 may be offered in multiple sizes. In some embodiments, the virtual environment display panel 1001 includes minimum borders on the edges. When multiple panels are installed, the virtual environment display panels 1001 are aligned as close as possible to its adjacent neighbors and the edges will seamlessly blend together. The arrayed virtual environment display panels 1001 will look like one very large display mounted on a wall. In some embodiments, a standard display size is approximately 32"×18" (37" diagonal) with UHD (3840×2160 pixels) resolution. A second size display is approximately 8"×6" with 960×720 resolution. Accordingly, in some embodiments, the smaller display is evenly divisible to the size of the main display. The smaller displays can be grouped to maintain alignment with the border edges of the large displays. To maintain a seamless display, the pixel pitch of both display sizes may be at 120 dots per inch (DPI) minimum. Since both display sizes have similar pixel pitch, there will be no discernible difference in video quality and brightness when both display sizes are mixed together in a wall installation. In some embodiments, the electrical interface of the virtual environment display panel 1001 may be MIPI DSI, or other sufficient interfaces.

Figure 11:
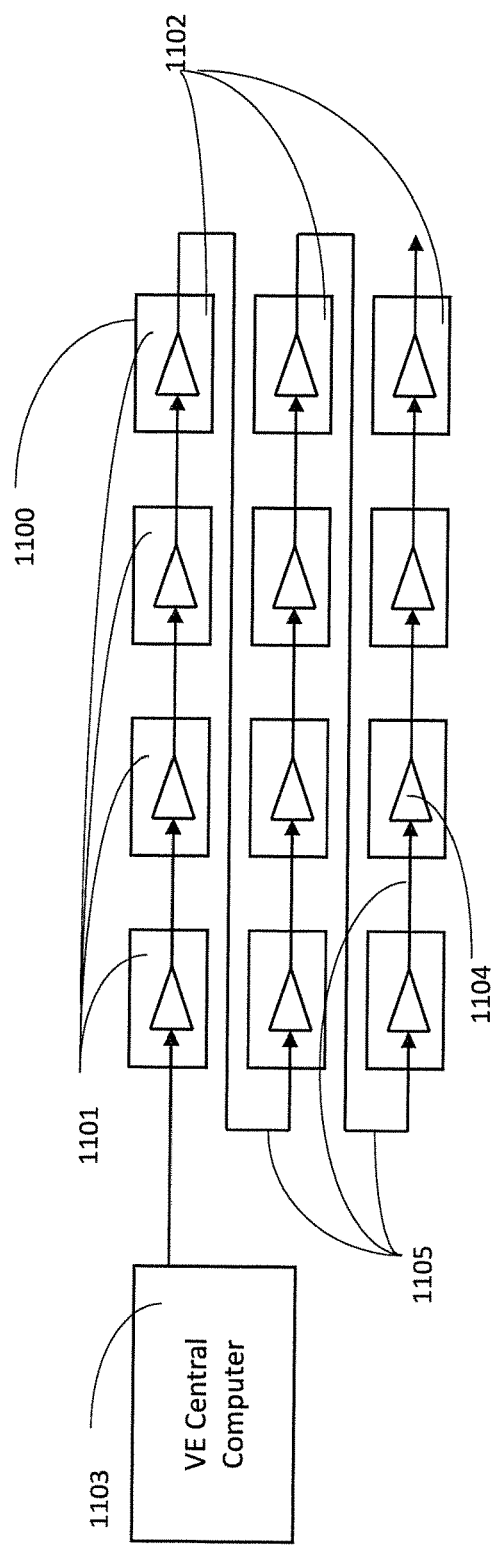
FIG. 11 is a schematic diagram of an embodiment of distribution of video sources to display panels to provide a virtual environment, which can be used in accordance with some aspects of the disclosure.

FIG. 11 shows an example interface for a serpentine video interconnect, according to some aspects of the disclosure. As shown in FIG. 11, multiple virtual wall panel units 1100 units are arrayed in columns 1101 and rows 1102 to simulate one large display that could fill an entire wall. Omitting virtual wall panel units 1100 units in the array is possible to maximize installation flexibility and accommodate walls with obstacles such as doors, windows, and fireplaces. The virtual wall panel units 1100 receive their video overlays and control bus from the virtual environment central computer 1103. To simplify and minimize cabling of the virtual wall panel units 1100 interconnect, each virtual wall panel units 1100 unit contains an active loop-through circuitry 1104 of the video and control bus to allow a serpentine type connection 1105 to each of the virtual wall panel units 1100 without each having a direct connection to the virtual environment central computer 1103.

In some embodiments, to reduce communication and network requirements, the background is pre-loaded on each virtual wall panel unit 1100. Accordingly, the background or relevant portion of the background is distributed once and stored in a cache of the virtual wall panel unit 1100 to provide additional processing as overlays are received. In some embodiments, the background can either be one 4K video, a 3d model, or another format. A background color may also be used to clear the output buffer just before the background video or 3D model is rendered. The overlays are then displayed over the background. The background color is important as the background video or 3D model may not cover the entire virtual wall panel array because the aspect ratio of the background may not match one to one to the aspect ratio of the virtual wall panels. The virtual wall panel units may replay or loop background videos and 3D models until changed to a new background video or 3D model. Each of the virtual wall panels may be provided with a particular video segment for its location in the array, or it may have an entire copy of the video and determine a portion to display. End users can upload pictures from their devices to the virtual environment central computer 1103 as well. Those pictures can be displayed as overlays. Since these do not change over time, they do not use any network resources once sent to the virtual wall panels 1100.

In order to provide synchronization between virtual wall panel units, upon startup, the virtual wall panel units 1100 can receive a vertical blanking line (VBL) message to synchronize the hardware of the system. One of the virtual wall panel units 1100 may be designated by a virtual environment central computer 1103 as a VBL leader responsible for setting messages to other virtual wall panel units 1100 to reset their VBL counter. The signal may be set at a regular interval to remain synchronization for the system. For example, the signal may be sent once per second, twice per second, or at other repeating intervals. Accordingly, the VBL leader broadcasts a message to other wall panel units 1100 and the remaining virtual wall panel units 1100 accept the VBL message and reset their counters accordingly. In some embodiments, the VBL is expected to be sent at the same time on all the virtual wall panel units 1100 so the message always arrives between the current VBL and the next VBL. In some embodiments, sending of the next VBL message may be delayed to reduce sending it too early.

In order to perform playback of a video, the virtual environment central computer 1103 can assign VBL number to each video frame. Then to generate a set of cached data at each of the virtual wall panel units 1100, the virtual environment central computer 1103 can start the counter when the video playback starts plus the number of frames in a selected amount of cache. Accordingly, for one second of cached data, the frames per second (such as 30 or 60) can be added to the VBL number for a frame. For example, the VBL counter is at 10,703 when the End User starts the playback of his video. The VCC sends the first frame with 10,733 as the VBL number on which the first video frame is expected to be rendered in the output. For each new frame, that counter is increased by one. Based on the future replay of sent video, for the first second, or other selected cache time, the VBL number may not match a frame number. Accordingly, for that time, a virtual wall panel unit 1100 can render a black overlay for the selected region of the video playback.

As long as the virtual wall panel units 1100 can match the VBL numbers simultaneously, they can display the video frames in synchrony. Multiple streams can be worked on in parallel using separate threads of execution. In order to make sure that each frame is ready on time, the system buffers a certain number of incoming frames in each virtual wall panel unit's 1100 memory. The synchronization between the incoming frames and the playback is done by making sure that the VBL counters match. This is particularly important for any video that appears on more than one virtual wall panel unit 1100. Although described as VBL numbers, other synchronizing can be performed with frame buffers and time based correction. For example, other indication of timing for displaying new frames on a display panel may be used. Furthermore, the time based correction can be performed through synchronization from one of the virtual environment wall panels or from a central computer.

Figure 12:
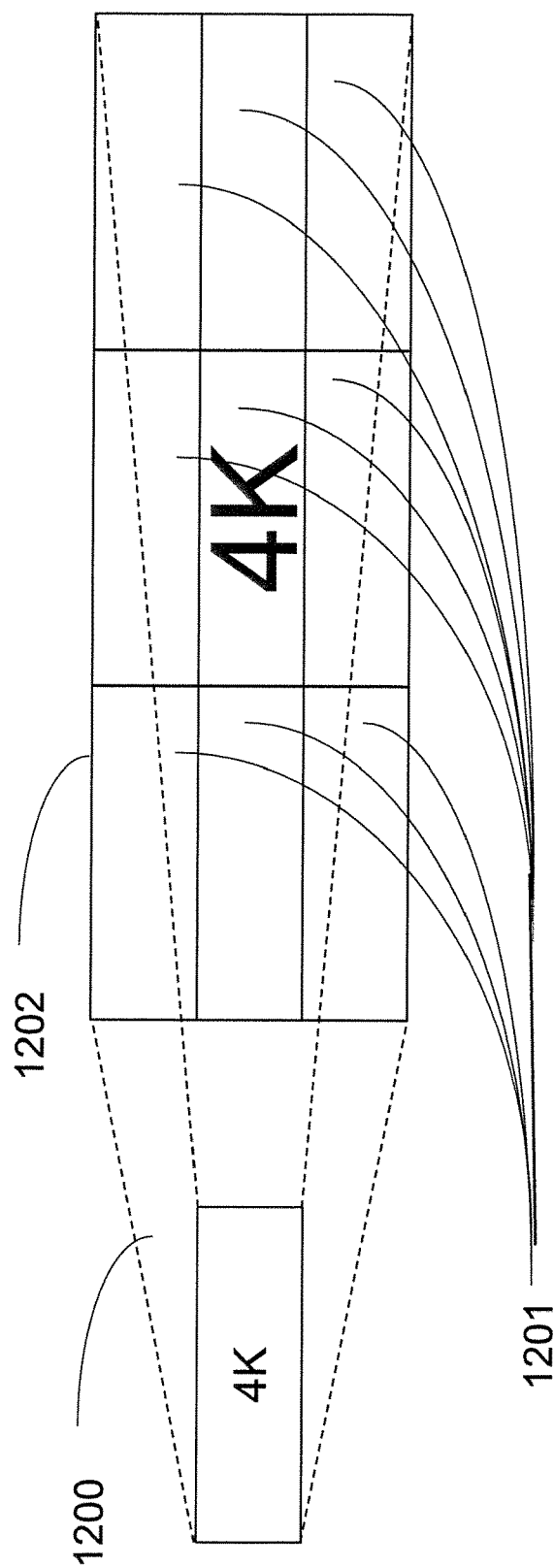
FIG. 12 is a schematic diagram of an embodiment of distribution of video sources to display panels to provide a virtual environment, which can be used in accordance with some aspects of the disclosure.
Figure 13:
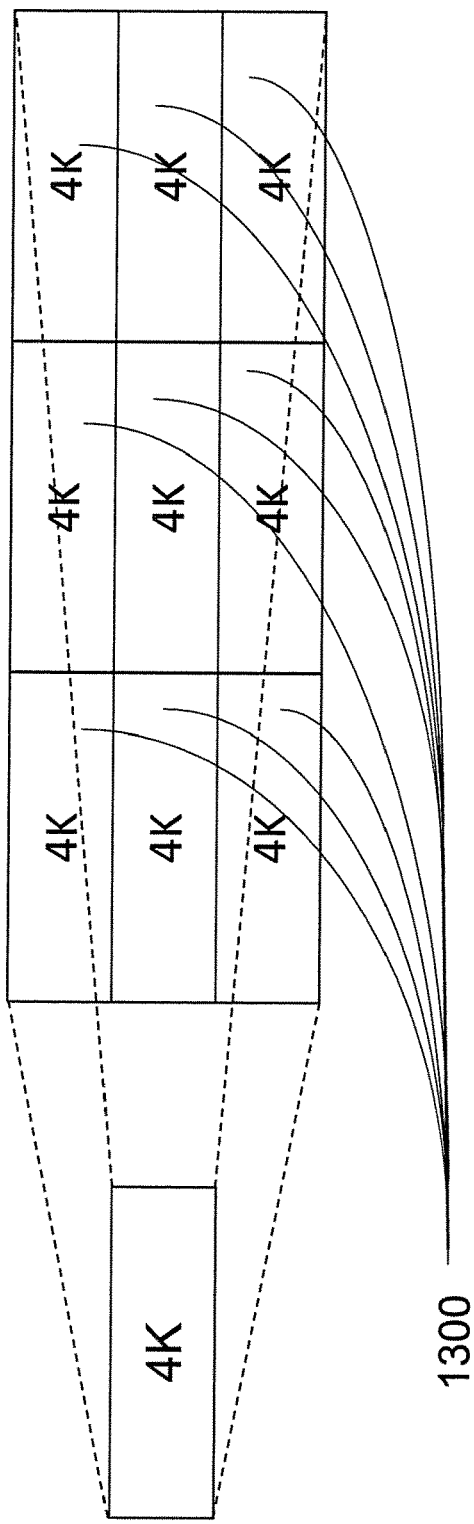
FIG. 13 is a schematic diagram of an embodiment of distribution of video sources to display panels to provide a virtual environment, which can be used in accordance with some aspects of the disclosure.

The virtual environment central computer 1103 can also preprocess videos for better quality once displayed on the virtual wall panel units 1100. As an example in FIG. 12, a single 4K video input can be split to feed multiple video screens 1201. Although each monitor 1202 is capable of displaying 4K for a total of 12K, because each monitor only displays ⅛th of the video, the resolution is still 4K as a whole for the display screen. Accordingly, to take advantage of better display screens 1202, video frames may be expanded to cover an entire virtual environment. In some embodiments, the expansion may be performed by starting with a higher quality video and splitting that for each of the display screens. In addition, an original 4K video stream can be expanded to provide 4K quality video on each of the display screens. For example, FIG. 13 shows that each monitor is showing a full 4K resolution video with an 12K video wall 1300.

Figure 14:
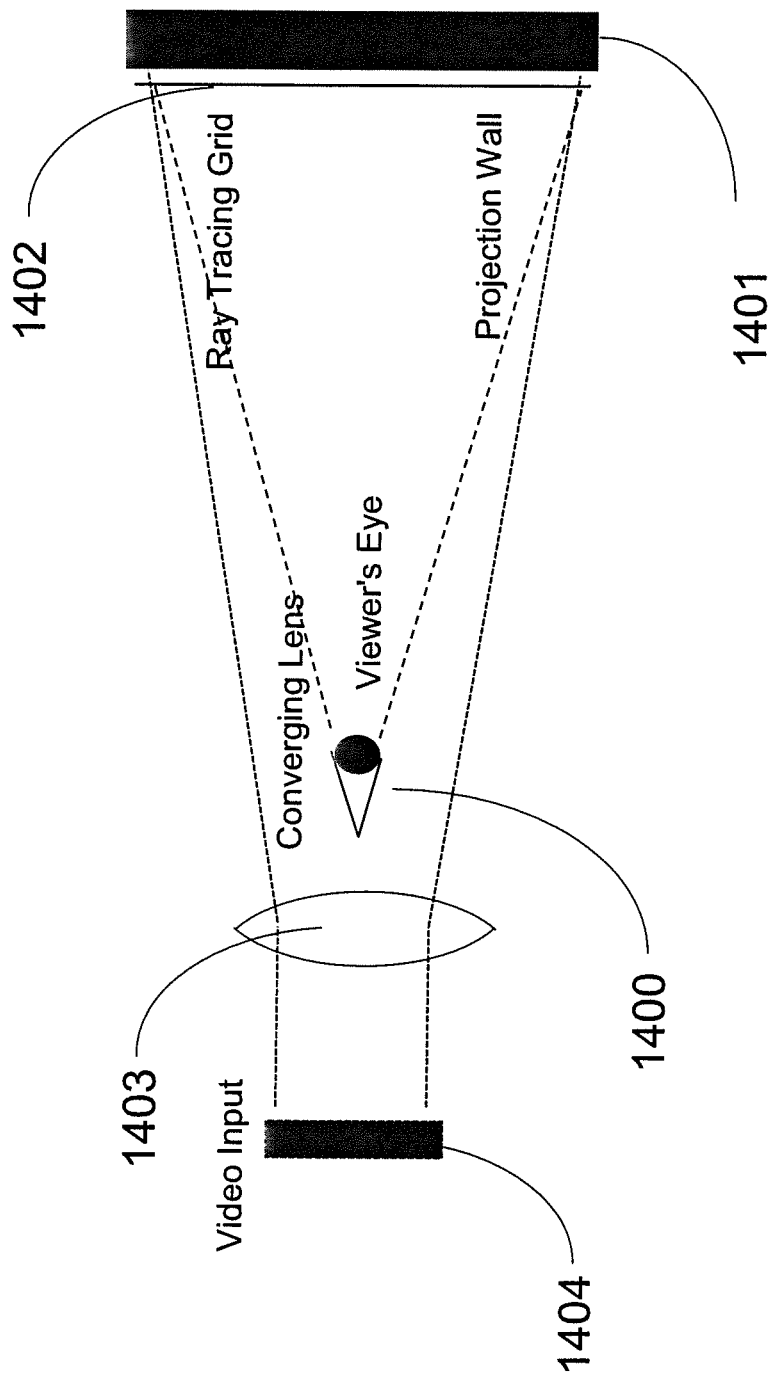
FIG. 14 is a schematic diagram of ray tracing calculations, which can be used in accordance with some aspects of the disclosure.

In some embodiments, the preprocessing transforming 4K, 8K, or larger videos is done using ray tracing in order to obtain the best possible quality. The processing applies the effect of a converging lens as used by a theater projector. FIG. 14 shows the Ray Tracing setup that can be used to provide distributed high quality video streams. The calculation for processing for ray tracing starts from the perspective of the viewer's eye 1400. Light rays are calculated between the eye, the ray tracing grid 1402, the projection wall 1401, the lens 1403, and finally, the video Input 1404. The ray tracing grid is where the resulting video frames are rendered. To reduce potential transformations, the ray tracing grid is calculated right in front of the projection wall. In order to obtain anti-aliasing, the system makes use of adaptive super-sampling to calculate multiple rays for each final pixel (see, e.g., FIG. 15). To properly place the Video Input, the Lens, and the Projection Wall in order to have a perfect focus and the expected final size the Lens (Eq. 1) and Magnification (Eq. 2) equations are used: where f is the focal, $d_o$ is the distance between the object (input video) and the lens, $d_i$ is the distance between the lens and the projected image, M is the magnification, $h_o$ is the height of the object (input video), and $h_i$ is the height of the projected image.

$$\frac{1}{f} = \frac{1}{d_o} + \frac{1}{d_i} \quad \text{(Eq. 1)}$$

$$M = \frac{h_i}{h_o} = -\frac{d_i}{d_o} \quad \text{(Eq. 2)}$$

Since the virtual environment central computer is in full control, it can automatically make sure that the projected image is in focus when generating the larger version of the video. Also, the resulting image is inverted horizontally and vertically by the lens. The software implementation can directly save the resulting pixels in the correct location to flip the image back to normal without using any further processing. This gives a better final effect as the colors are better diffused than using a quick resize that expands an image several folds. As a result, each virtual wall panel unit displays a distinct 4K video file to playback as part of the large background. This Background Video Processing is not necessary for 3D environments, which automatically scale to the VE Wallpaper in use assuming that said environments come with very high-quality textures. Creating all the 4K videos of a new background may take some time especially on the virtual environment central computer. Accordingly, the background may be generated once and transmitted to the virtual wall panel units. In some embodiments, the virtual wall panel units may generate expanded video displays for themselves.

Figure 15:
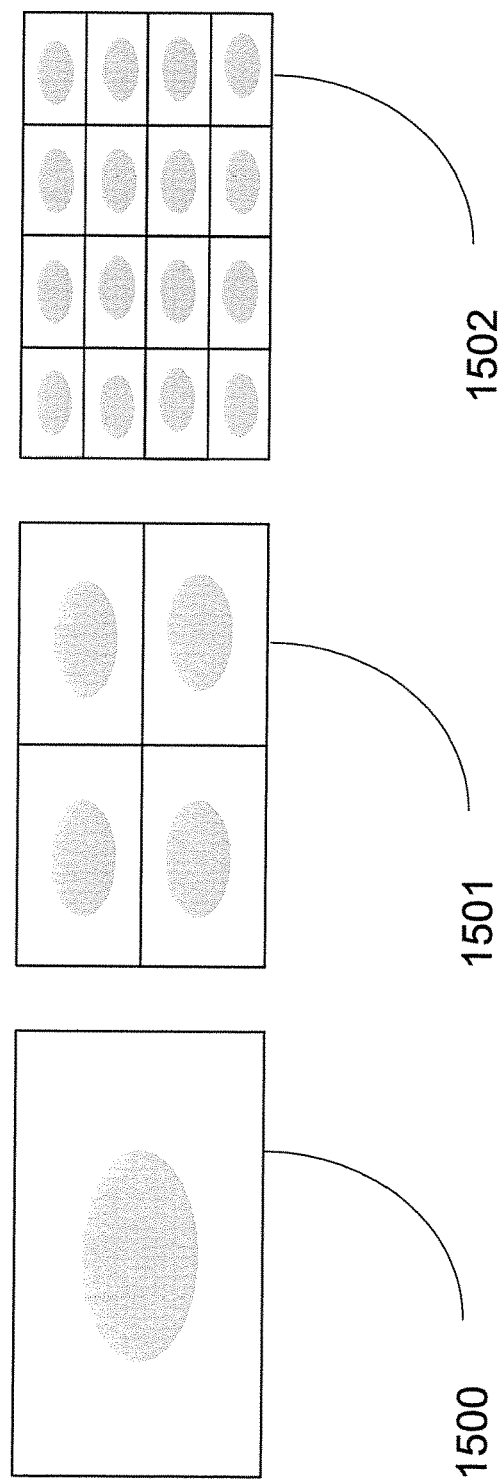
FIG. 15 is a schematic diagram of super-sampling calculations, which can be used in accordance with some aspects of the disclosure.

In order to create the crispest version of a background for a large wall, the best available algorithm to generate good anti-aliasing without excessive blurriness is used. This is in part achieved by using adaptive super-sampling. FIG. 15 shows how the adaptive super-sampling works. The system calculates the pixel as shown in the left square 1500. To do so, it determines the color of the source using ray tracing computation going through the lens. The ray is going to hit from one to four pixels in the source texture. FIG. 15 shows the case when four pixels are hit. This results in a few possible cases. In the first case, all sub-pixels have a very similar color, then the average of those sub-pixels is used as the resulting color of the pixel 1501. In other cases, the sub-pixels have dissimilar colors, the process happens recursively and sub-divide these sub-pixels further and calculate the color from one to four pixels per sub-pixel 1502. In some embodiments, this process can be recursively repeated any number of times with more and more precision. However, for speed reasons and because at some point such precision is not adding much to the quality of the resulting image, the number of times the sub-division is used is limited by a maximum recursive depth parameter. This maximum increases as the size of the virtual wallpaper increases.

Figure 16:
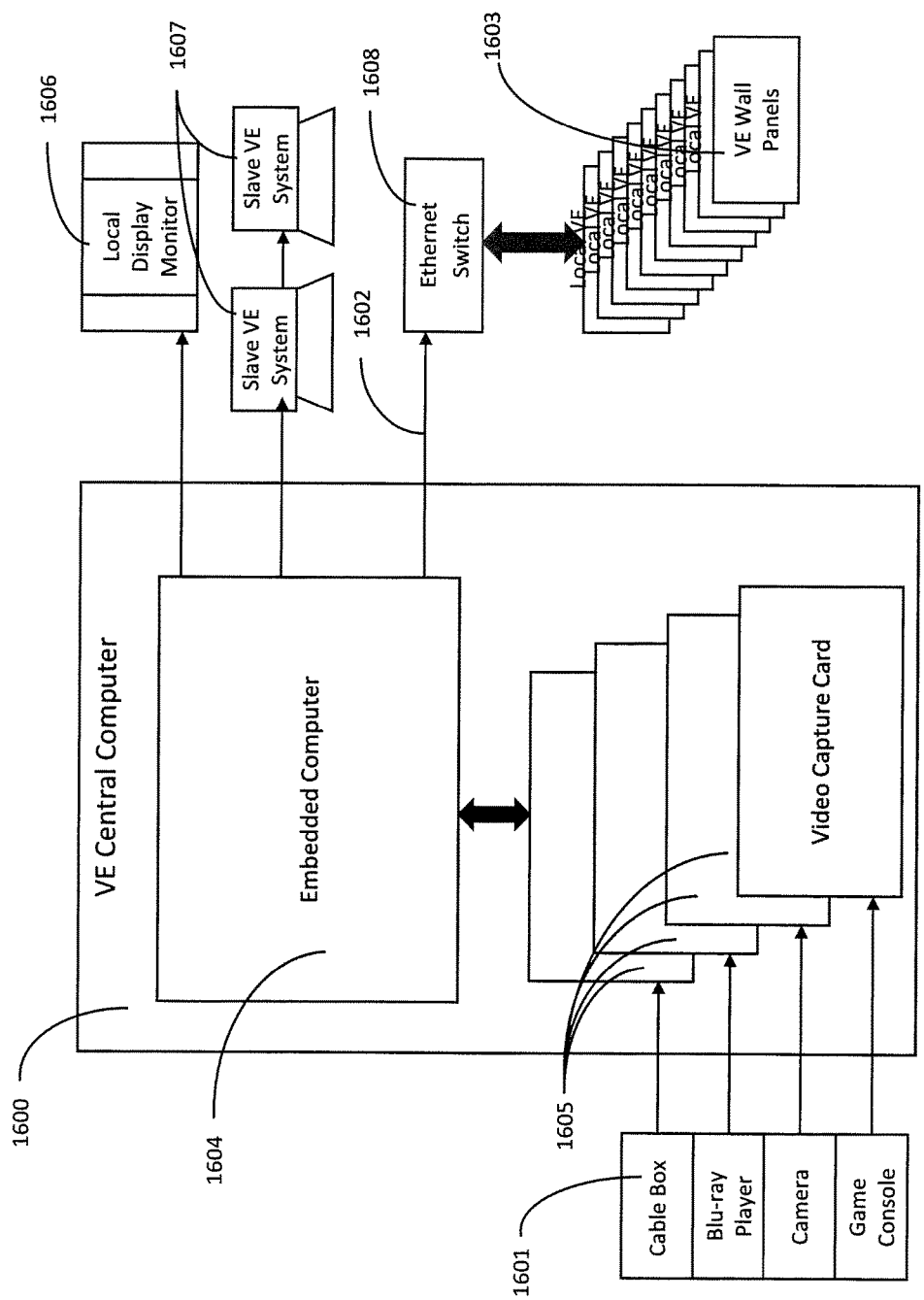
FIG. 16 is a schematic diagram of an embodiment of systems to provide a virtual environment, which can be used in accordance with some aspects of the disclosure.

FIG. 16 shows another example embodiment of a virtual environment system as described herein. The embodiments shown in FIG. 16 provide video over a network version of the virtual environment. In some embodiments, the virtual wall panel units 1603 use single board computers executing real-time firmware to execute the necessary signal processing. Distribution of the video to the virtual wall panel units 1603 utilizes compressed and streamed video over Ethernet network in a distributed star topology.

The virtual environment central computer 1600 in FIG. 16 is an appliance containing the necessary video connectors to connect the user's video sources 1601. In some embodiments, the maximum resolution of the video sources is UHD (3840×2160 pixels). Although shown with 4 HDMI connections, the virtual environment central computer 1600 can have fewer or additional input connectors as well as other types of inputs. These inputs can be configured to drive any of the overlays of the virtual environment. The virtual environment central computer 1600 also has network connection 1602 to stream the overlays to the virtual wall panel units 1603. In some embodiments, the virtual environment central computer 1600 includes an embedded computer 1604, and video capture cards 1605. In some environments, one of the video sources 1601 may be a camera which is embedded in one or more of the display panels and connected by microfiber to the video capture card. In this manner, the display panels can operate as a virtual mirror.

The embedded computer 1604 executes processes to enable delivery of video sources to virtual environment wall panels 1603. The computer runs a real-time operating system ("RTOS") and provides system management, real-time video processing, BG video rendering, GUI generation, and system configuration. The embedded computer 1604 may also include a graphics card connected to a local monitor display 1606 to view the parametric setup of the virtual environment. The virtual environment central computer 1600 may communicate to other slave virtual environment systems 1607 to support a multi-wall installation in a room.

In some embodiments, the virtual environment central computer 1600 provides Configuration management of the virtual wall panel 1603. After initial installation of the panels, a technician can setup the virtual environment based on the configuration of the panels. The configuration includes the number of rows and columns of the panels, missing panels to go around doors and windows, touchscreen calibration parameters, etc. The configuration may be stored on the virtual environment central computer 1600 to use when restarting the system.

In some embodiments, the virtual environment central computer 1600 multicasts data to the virtual environment wall panels 1603 for display of each of the video overlays. For example, each of the video overlays is sent to the local virtual environment wall panels 1603 using Internet Protocol (IP) multicast broadcasting. The IP addresses of the overlay multicast streams are configured by the virtual environment central computer 1600. The virtual environment central computer 1600 communicates the IP address of the multicast streams to the local virtual wall panels 1603. Accordingly, the virtual environment central computer 1600 can determine the unique IP address of each virtual environment wall panel. The virtual environment central computer 1600 maps the IP addresses against the panels' physical locations on the wall. The virtual environment central computer 1600 individually controls each panel based on user intervention.

The virtual environment central computer 1600 can provide a user with full control of the size and position of each video overlay. The virtual environment central computer 1600 tracks of how each overlay spans across multiple virtual environment wall panels 1603. The virtual environment central computer 1600 computes the video pixel counts, line counts and X/Y positions of each overlay and determines which VWP will display the configured overlays. Next, every virtual environment wall panel 1603 displaying the overlay configures its own overlay pixel count, line count, and X/Y position. The virtual environment central computer 1600 may also assign input video sources to each overlay.

In some embodiments, video inputs may be digitized by the video capture cards 1605 and can be encoded to an industry compression standard. For example, video may be encoded to MP4, H.264, or other compression standard. The encoding is performed by the virtual environment central computer 1600 in real-time. In some embodiments, BG compressed format video files could be any resolution or aspect ratio. The virtual environment central computer 1600 provides the controls to size, position, crop (variable, full, letterbox, or anamorphic) the BG to fill the installed panels.

In some embodiments, user interaction is performed using the integrated virtual touch system. The user interacts with the displayed GUI by touching the screen and the absolute coordinates of the touch are sent to the virtual environment central computer 1600 through standard USB Human Interface Device ("HID"). The virtual environment central computer 1600 can also generate and provide the GUI that will be displayed on the top overlay. Graphical icons, visual indicators, and context sensitive text are displayed to efficiently enable users with full software/hardware control of the virtual environment system.

The video capture cards 1605 is an expansion card for modern computer desktops and is used to digitize and capture live video sources. These expansion cards typically feature HDSDI or HDMI video input connectors. The video capture cards 1605 may be connected to the user's UHD video sources 1601 such as Cable Set Top Boxes, BluRay Players, Game Consoles, etc. The video capture cards 1605 compress the video in real-time using software driver encoding. The virtual environment central computer 1600 assigns the outputs of the Video Capture Cards to one or more overlays.

The virtual environment system may also include an Ethernet switch 1608 to distribute the network video traffic from the virtual environment central computer 1600 to multiple virtual wall panels 1603. In some embodiments, the Ethernet switch 1608 may be a non-blocking type to minimize bottlenecks in the network traffic. The Ethernet switch 1608 may also support IGMP Snooping for optimized multicast support. The number of ports on the Ethernet Switch is dictated by the number of virtual wall panels 1603 in a wall installation. Accordingly there may be a set number of ports to provide a dedicated port for each virtual wall panel 1603.

Figure 17:
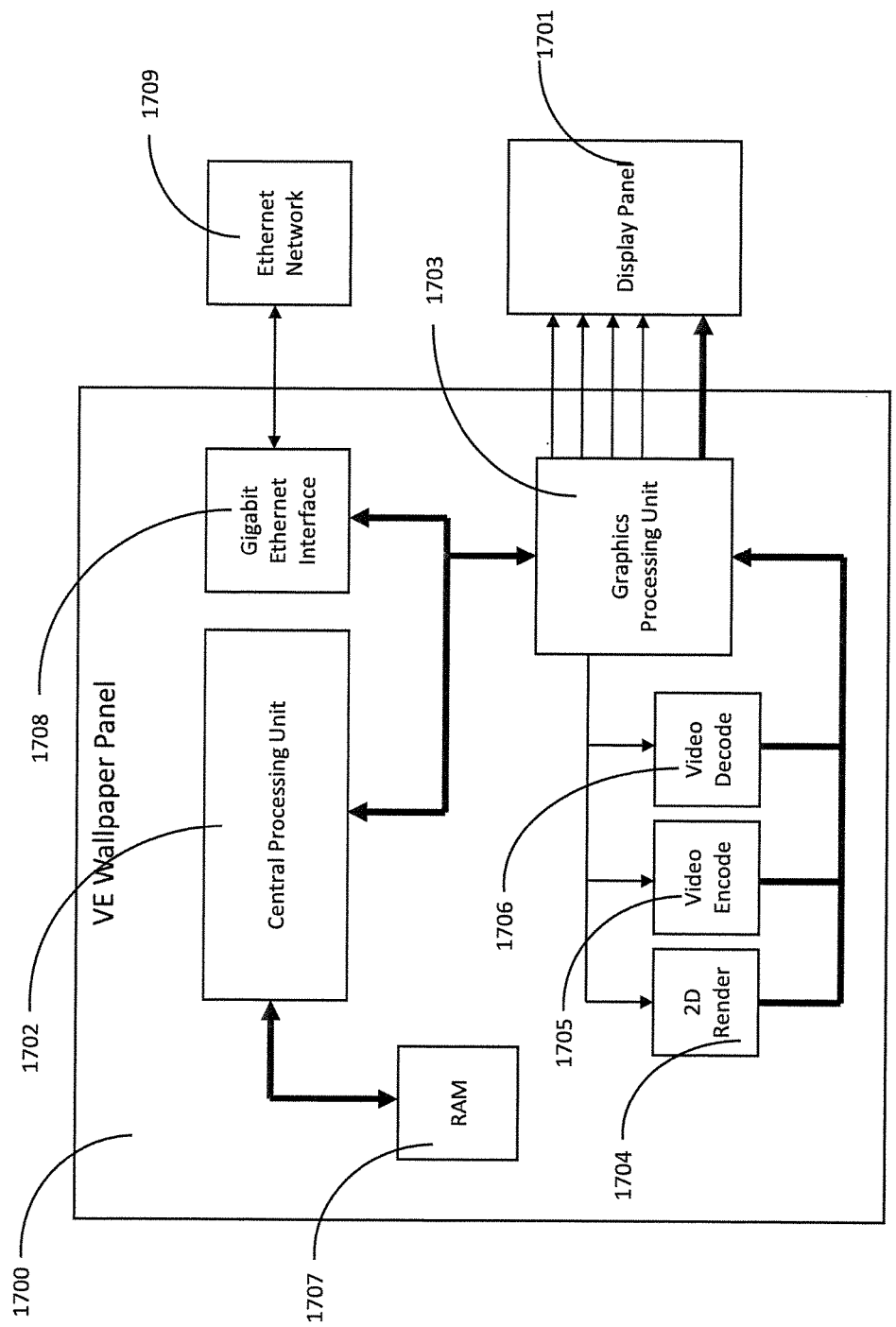
FIG. 17 is a schematic diagram of an embodiment of systems to provide a virtual environment, which can be used in accordance with some aspects of the disclosure.

FIG. 17 shows an example embodiment of a virtual environment wallpaper panel 1700. For example the virtual environment wallpaper panel 1700 may be the same or similar to the virtual wall panels 1603 described with reference to FIG. 16. In some embodiments, the virtual environment wallpaper panel 1700 may be a configurable display panel with one or more processors running real-time firmware for video processing. Multiple virtual environment wallpaper panel 1700 units are arrayed by rows and columns to comprise the virtual environment video wall. Omission of certain panel installations is possible to accommodate walls with windows, doors, fireplaces, etc. The virtual environment wallpaper panel 1700 can be offered in multiple sizes and can be mixed and matched during installation for maximum flexibility.

In some embodiments, each virtual environment wallpaper panel 1700 unit is capable of receiving the same video overlays and control. Ethernet network is employed to distribute the video overlays and control from a virtual environment central computer. The video overlays can span across all or part of the panels depending on the configuration by the user. The virtual environment central computer computes all the installed panels' overlay window so each panel knows which section of overlay to display on its respective virtual display panel 1701.

The virtual wallpaper panel 1700 can include a display panel 1701 an associated processing systems. The processing system may be a single board processor. In some embodiments, the virtual environment wallpaper panel 1700 includes a central processing unit 1702, a graphics processing unit 1703, memory 1707 and other processing components. The CPU 1702 can include a multi-core (e.g., hex core or greater) integrated in an SBC embedded platform. This CPU 1702 can execute firmware provided by the central computer. In some embodiments, multiple threaded applications execute simultaneously to streamline the resource tasks of the firmware. Such resource tasks include real-time decoding of the overlay videos.

The GPU 1703 can accelerate multimedia computing. For example, the GPU 1703 may include processes for 2D rendering 1704, video encoding 1705, and video decoding 1706, or the like, and offload these heavily parallelized tasks from the CPU. The GPU generates the graphics to drive the virtual display panel 1701. The virtual environment wallpaper panel 1700 may also include additional processing systems as well as an Ethernet interface 1708 (which may be replaced with other network interfaces).

The virtual environment wallpaper panel 1700 may receive control parameters from a central computer or from other wallpaper panels. The virtual environment wallpaper panel 1700 also decodes streamed video and prepares those for display on display panel 1701. In some embodiments, the virtual environment wallpaper panel 1700 can also zoom into overlay video in real time. For example, this may be performed when resolution of provided video is different than that resolution of the display panel 1701. In some embodiments, the virtual environment wallpaper panel 1700 also provides adjustment to a window of interest of the overlay videos. For example, the virtual environment wallpaper panel 1700 may zoom into a portion of an overlay that is to be provided to the display panel 1701 and disregard other portions of a provided overlay.

Figure 18:
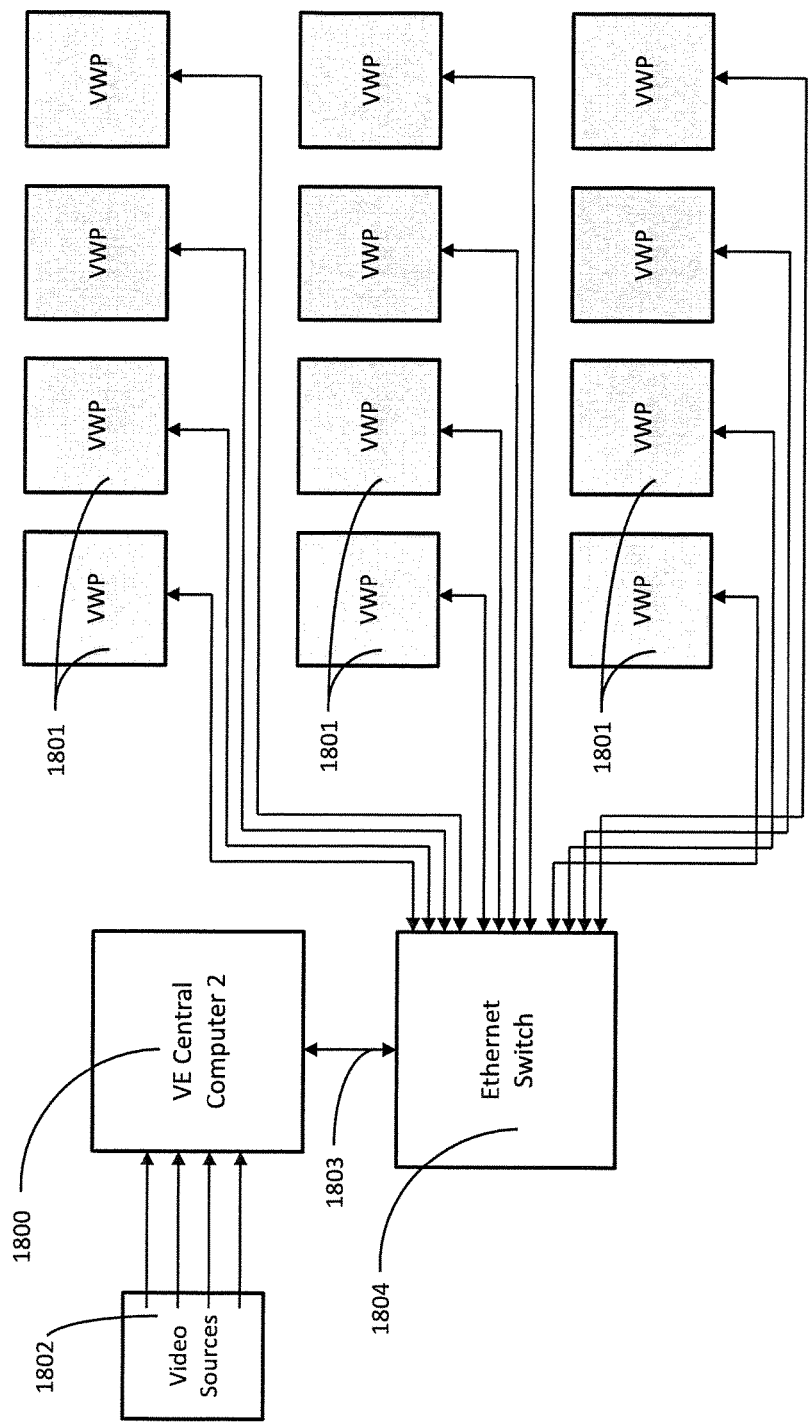
FIG. 18 is a schematic diagram of an embodiment of distribution of video sources to display panels to provide a virtual environment, which can be used in accordance with some aspects of the disclosure.

FIG. 18 shows a depiction of a virtual environment central computer 1800 distributing video sources 1802 through an Ethernet switch 1804 to a set of virtual wall panel units 1801. The virtual environment central computer 1800 and the virtual wall panel units 1801 are interconnected in a distributed network forming a star topology. The virtual environment central computer 1800 receives the video sources 1802 (BluRay, Cable box, streaming services, or the like) from HDMI inputs of the integrated video capture cards. The virtual environment central computer 1800 sends controls through the Ethernet port 1803. The virtual environment central computer 1800 can assign any HDMI or other input sources to any of the video overlays. The virtual environment central computer 1800 may also encode each overlay videos to an industry compression standard such as H.264, and then streams the overlays to any virtual wall panel unit 1801 through the Ethernet switch 1804. In some embodiments, to optimize network traffic, multicast is used to broadcast the streamed overlays. The virtual environment central computer 1800 manages all virtual wall panel units 1801 to determine which portion of the overlays is to be displayed on the virtual wall panel unit's 1801 local display panel.

Figure 19:
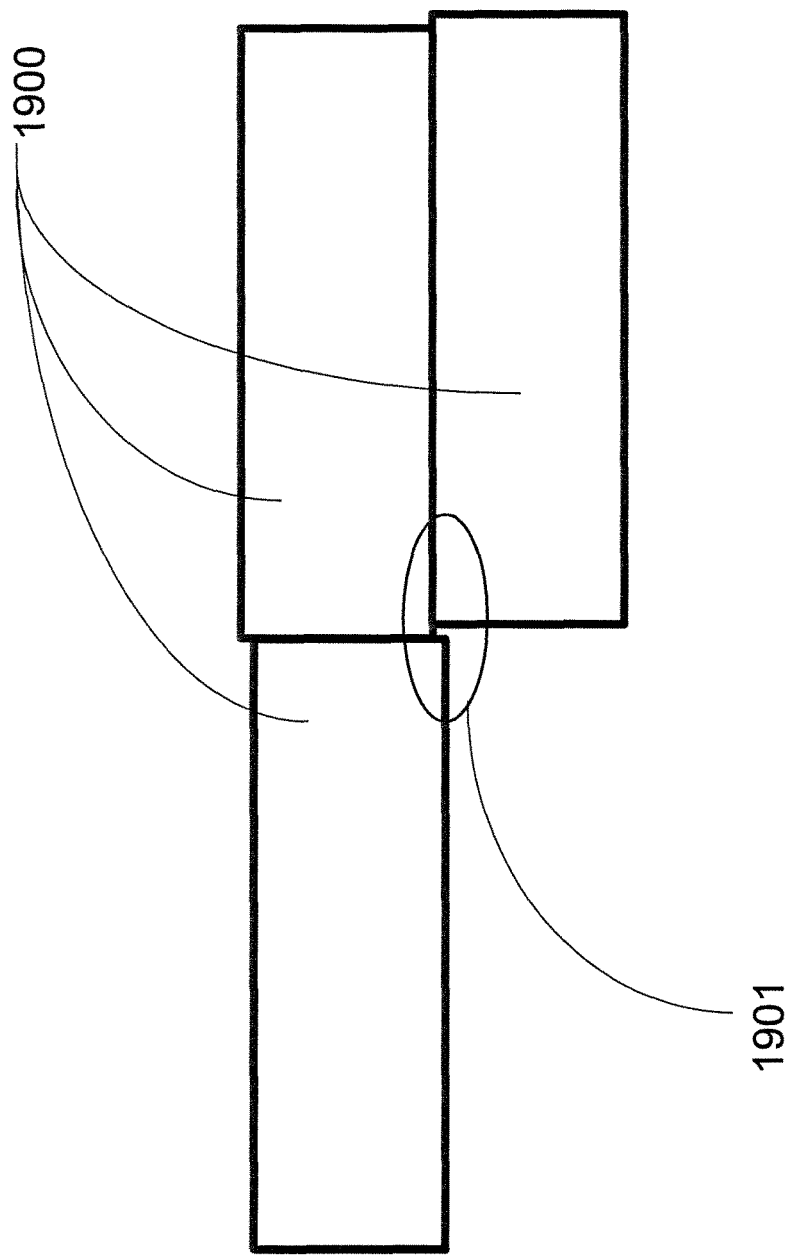
FIG. 19 is a schematic diagram of an embodiment of placement and alignment of display panels, which can be used in accordance with some aspects of the disclosure.
Figure 20:
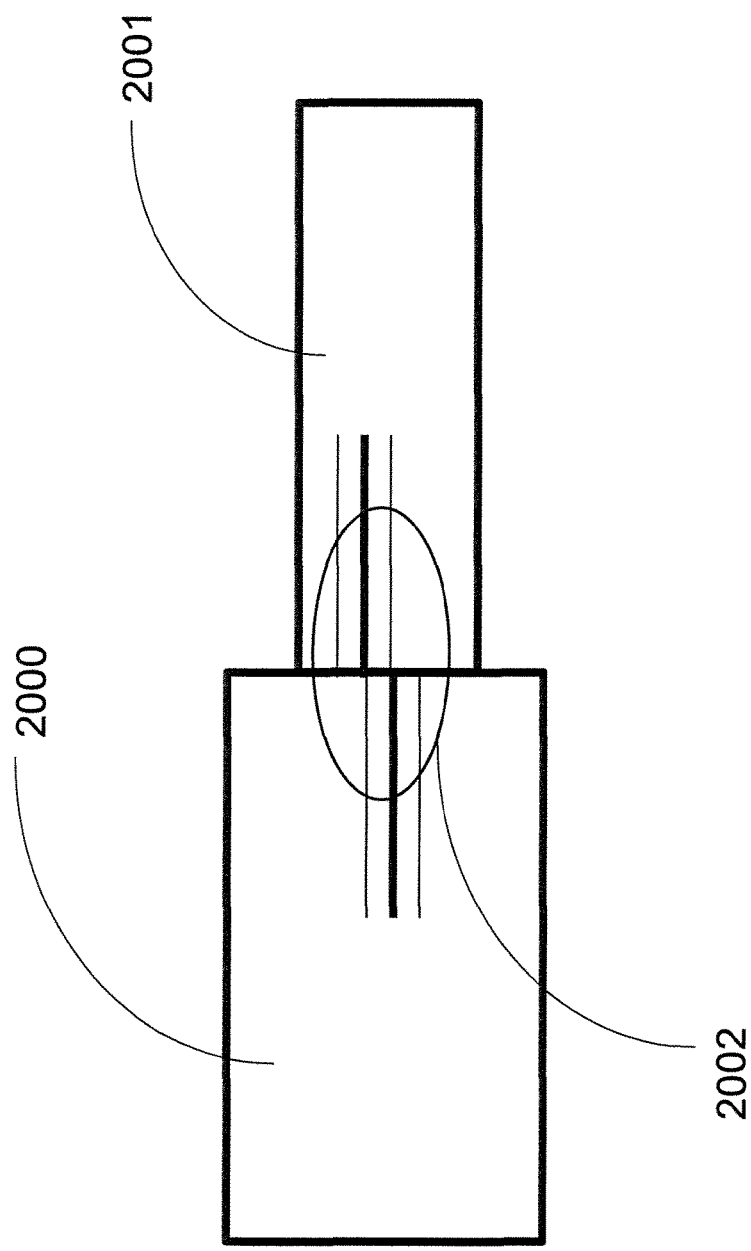
FIG. 20 is a schematic diagram of an embodiment of placement and alignment of display panels, which can be used in accordance with some aspects of the disclosure.
Figure 21:
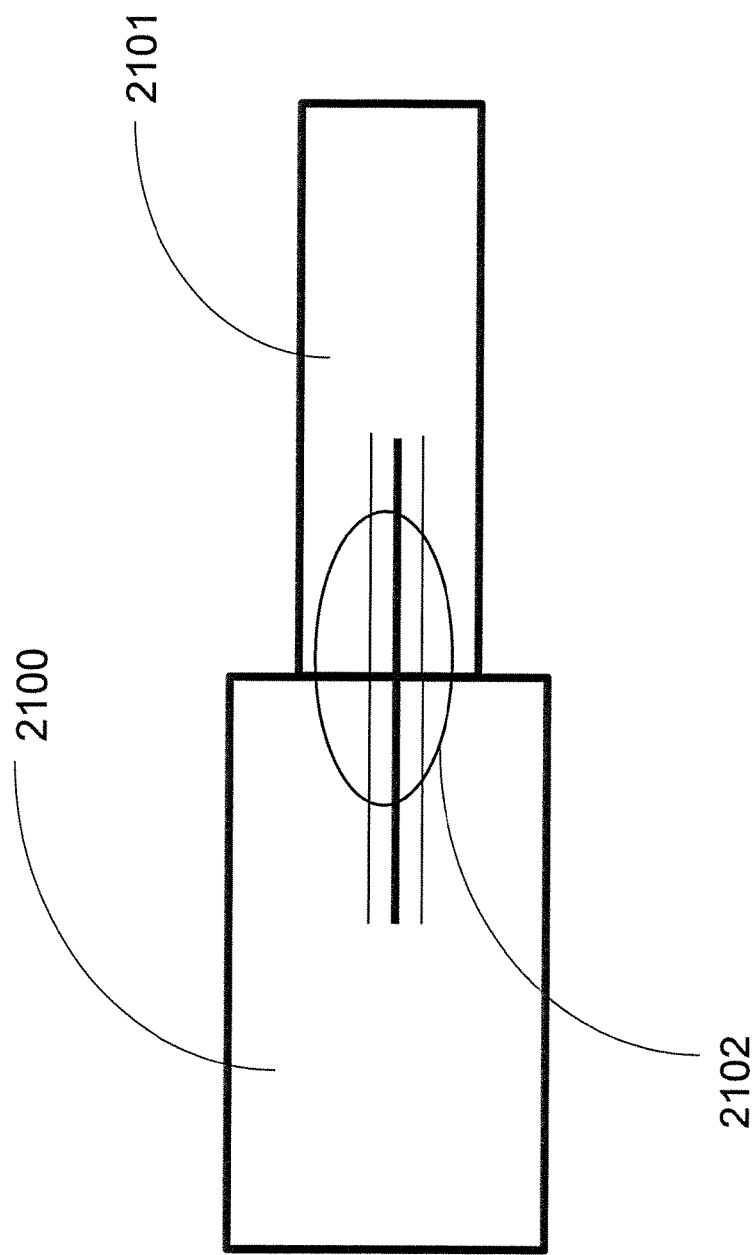
FIG. 21 is a schematic diagram of an embodiment of placement and alignment of display panels, which can be used in accordance with some aspects of the disclosure.

FIGS. 19-21 show example virtual wall panel units being aligned upon installation. The installation of the virtual wall panel units on a wall is likely to have slight gaps between panels since most walls are not perfectly flat or plumb. FIG. 19 shows how small gaps 1901 could end up appearing between horizontal or vertical panels 1900. However, administrative settings allow for fine adjustments to be made to each video screen. The mechanism used is by drawing diagonal and straight lines on the entire wall installation. The administrator can then adjust the position of each video or display screen by moving each video by a few pixels as required. The result is a VE Wallpaper that looks like it has minimum gaps.

As an example, FIG. 20 shows two adjacent panels 2000, 2001 that are misaligned (in this case, one is a sub-panel which is more likely to get misaligned). FIG. 21 shows how the lines will look once the alignment is fixed by the administrator. In some embodiments, if three sub-panels are installed vertically, then three sets of horizontal lines are displayed to allow the adjustment of full panels and all possible sub-panels. Similarly, if four sub-panels are installed horizontally, then four sets of vertical lines are displayed to allow the adjustment of full panels and all possible sub-panels.

In some cases, the setup of a complete virtual wallpaper may be performed starting around the center panel and proceeding left and right then repeat going up and finally down. The virtual environment system is capable of locking a virtual wall panel's location. This capability should be used on the center virtual wall panel. All the other panels can then be adjusted according to the center panel. In some embodiments, the virtual environment system may show diagonals instead of horizontal and vertical lines. This way it is possible to align a virtual wallpaper horizontally and vertically at the same time.

Figure 22:
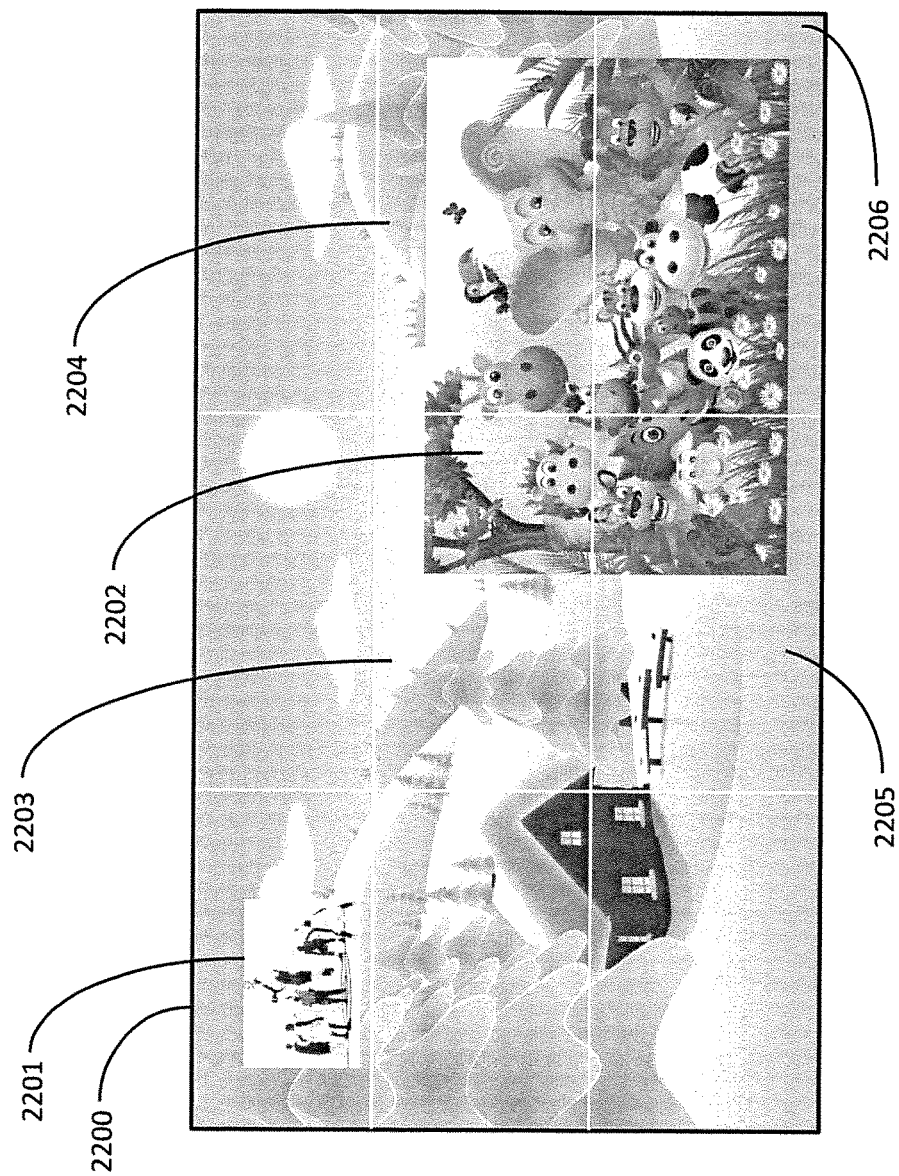
FIG. 22 is a schematic diagram of virtual environment in operation, which can be used in accordance with some aspects of the disclosure.

FIG. 22 shows an example virtual environment keeps all Picture-in-Picture (PIP) elements 2201, 2202 and the background element in their native high resolution formats and transmitting all elements separately to the virtual wall panels. For example, virtual wall panel 2200 will accept the full high-resolution of the PIP 2201 and the background element. The virtual wall panel 2200 then combines the two elements at the last phase prior to displaying on its local virtual display panel. Virtual wall panels 2203, 2204, 2205, and 2206 will accept the full high-resolution of PIP 2202 and the background. The virtual wall panels 2203, 2204, 2205, and 2206 then combine the two elements at the last phase prior to displaying on their local virtual display panels. This process maintains full high-resolution of all elements including background and overlays during transmission to the virtual wall panels and minimizes loss of detail degradation of the smaller PIP elements compared to the background.

In order to provide high resolution images on the display screens, the virtual environment system's background video and the PIP overlays are sent independently to the virtual environment wall panels. Accordingly, shrinking, layering, and flattening of the PIP videos are performed in the final stage during transmission to the displays and all the videos retain their native high resolution formats. Because the virtual environment wall panels receive all and all PIP overlays in their native high resolution format, the virtual environment wall panels contain video scalers and video mixers to perform functions such as spanning the background video across all the arrayed virtual environment wall panels. The spanning makes the array of the virtual environment wall panels look like one very large display.

Figure 23:
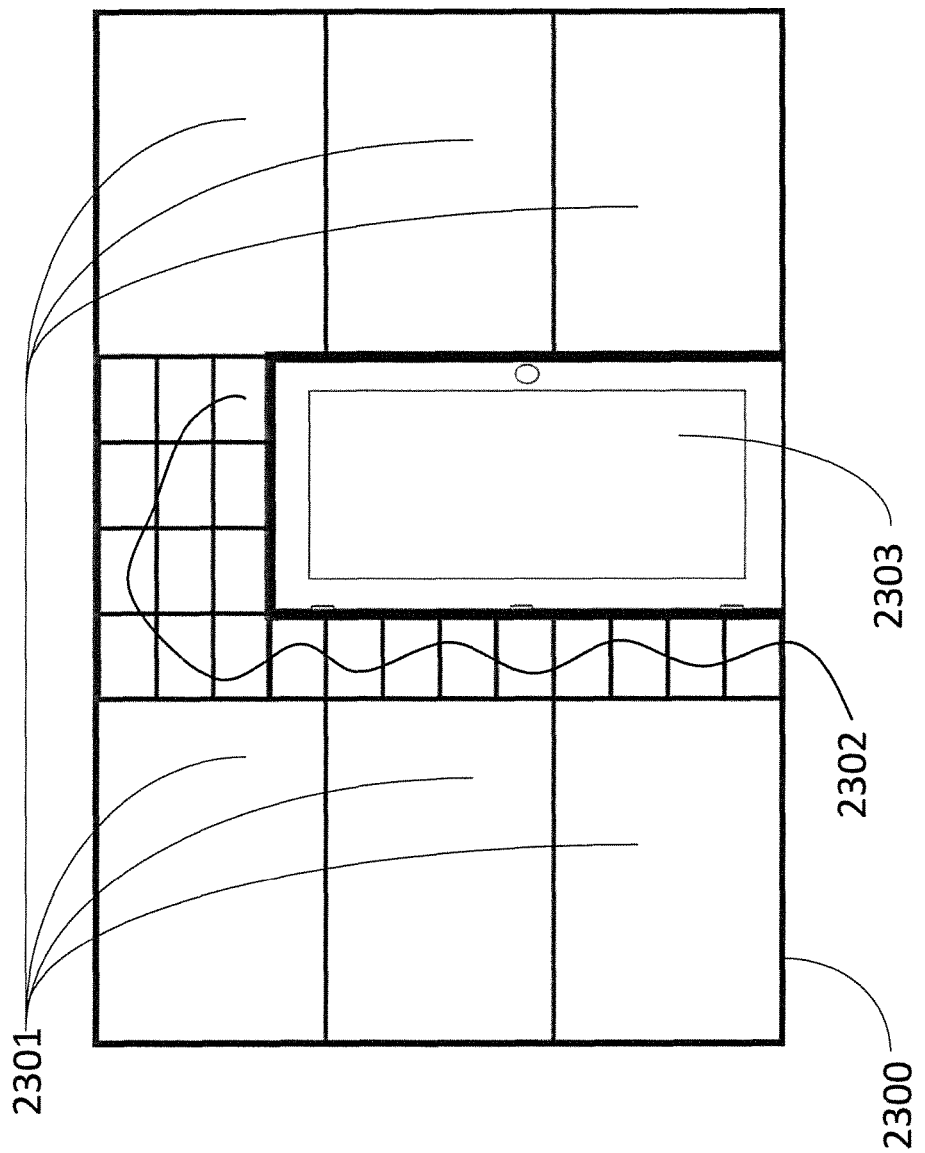
FIG. 23 is a schematic diagram of placement of display panels for a virtual environment, which can be used in accordance with some aspects of the disclosure.

FIG. 23 shows an example of an array of larger display panels 2301 along with an array of smaller display panels 2302. The smaller display panels enables the array 2300 to have coverage closer to door 2303 than if the larger display panels were used on their own. This arrangement takes advantages of using large displays to cover most of the wall, while using small displays to fill potential gap areas. In some embodiments the smaller display units 2302 may be sized to fit a set number within the size of a larger display unit 2301 to easily combine the display types. In addition, in some embodiments, additional sized or shaped display units may be used as part of an array 2300 of display units.

Figure 24:
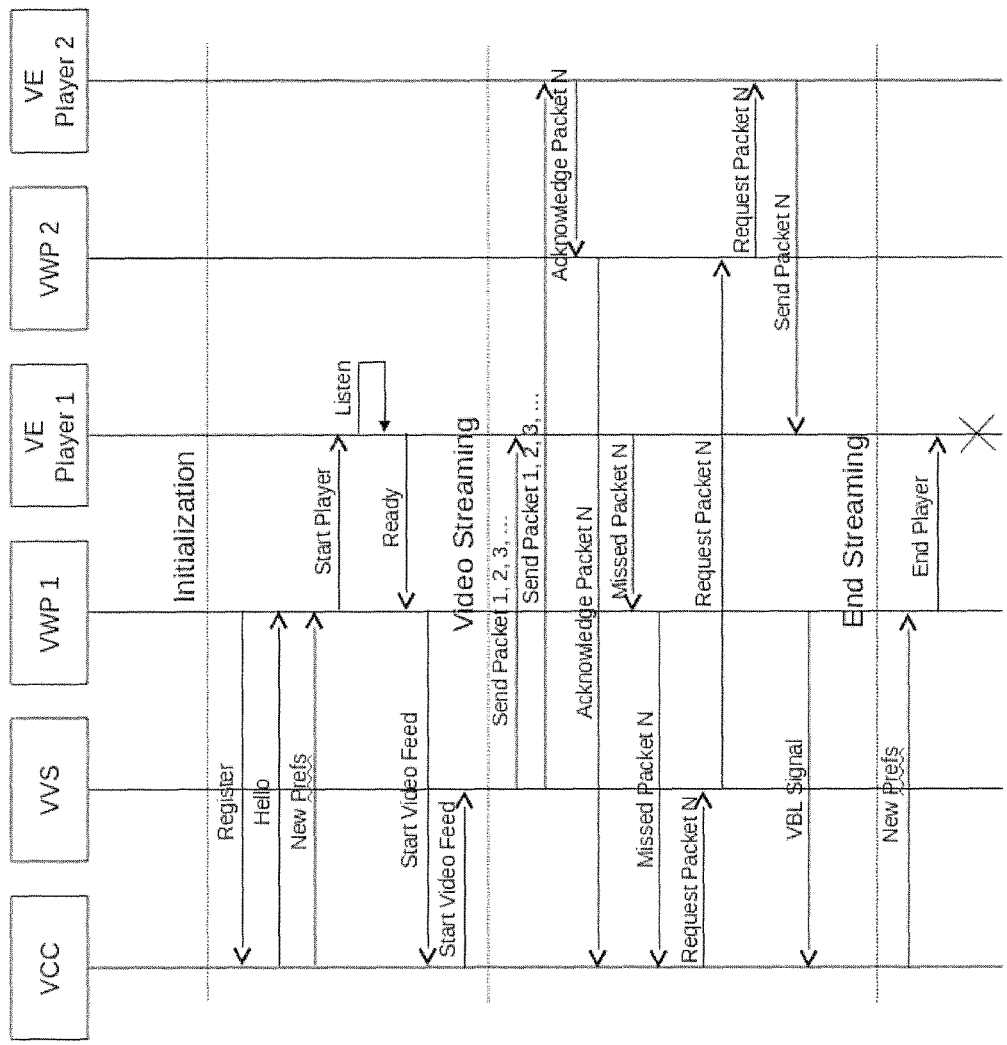
FIG. 24 shows basic messaging used to set up and run a streaming process between a central computer and a virtual wall panel unit, which can be used in accordance with some aspects of the disclosure.

FIG. 24 shows basic messaging used to set up and run a streaming process between a central computer and a virtual wall panel unit. During installation an virtual wall panel unit may begin operations to request preferences from the central computer. To initialize the process, a panel unit may connect to a preferences service of a central computer. Once connected, the virtual wall panel unit is ready to receive messages about changes to the preferences data. One specific message directs the virtual wall panel unit when an overlay is added to the system and this virtual wall panel unit is concerned by that overlay. In response, the virtual wall panel unit starts a player thread which starts listening for UDP Packets. The player thread then states that it is ready to receive packets through the controller. In response to receiving a notification, the controller receives a notification for concerned virtual wall panel units and sends a message requesting the video processes to start streaming the data.

In some embodiments, the video thread process sends UDP packets to all concerned virtual wall panel unit. In some embodiments, the central computer sends a single UDP packet to all the listening virtual wall panel units. Accordingly, the central computer can use a single connection (e.g., a 1 Gb connection, lower connection rates, or higher connection rates). The switch is responsible for replicating the UDP packets to all the concerned virtual wall panel units. That way the system can reduce network bandwidth.

Each time a virtual wall panel unit receives a frame successfully, it acknowledges so by sending a message to the controller, which in turn informs the central computer of the receipt. In some embodiments, each packet may include a frame number, a packet number, and packet data (e.g., the frame data. Depending on the embodiment, a system may have a set packet size. Accordingly, packet size may not be included in the packet. However, the last UDP packet may be smaller. A size of the last packet may be calculated as:

$$S_{total} \bmod S_{packet} \quad \text{(Eq. 3)}$$

Where $S_{total}$ is the total size of the video frame and $S_{packet}$ is the size of one UDP packet.

When the modulo returns zero, the last packet is also a full-size packet.

The total number of packets can then be defined as:

$$\left\lceil \frac{S_{total}}{S_{packet}} \right\rceil \quad \text{(Eq. 4)}$$

In some embodiments, the video thread process sends UDP packets to all concerned virtual wall panel unit. In some embodiments, the central computer sends a single UDP packet to all the listening virtual wall panel units. Accordingly, the central computer can use a single connection (e.g., a 1 Gb connection, lower connection rates, or higher connection rates). The switch is responsible for replicating the UDP packets to all the concerned virtual wall panel units. That way the system can reduce network bandwidth.

The video playing processes can then check a packet number of each packet they receive. The packets are generally expected to arrive in the order they are sent. However, these are UDP packets and they are not ensured to arrive or stay in order. Yet, if a packet number is missing and after a VWP received a few more packets, it sends a missing packet message to the controller. The final effect of that message is for one of the video source or another virtual wall panel unit to send a copy of that one missing packet. In some embodiments, the virtual wall panel units are favored over the streaming video source in order to not increase the network traffic between the central computer and the switch. In order to respond to requests for missing packets, virtual wall panel units can also cache video data.

In some embodiments, to improve caching and reproduction by other virtual wall panel units, even if the overlay is only required on a single virtual wall panel unit, the central computer may select at least one other virtual wall panel unit as a target to send the UDP packets. The second virtual wall panel unit target is selected among one which does not currently receive overlay data, receives limited overlay data, is located nearest the virtual wall panel unit receiving data, or based on other factors or a combination of factors to improve operation of the system.

Reference throughout this specification to "one embodiment" or "an embodiment" means that a described feature, structure, or characteristic can be included in at least one described embodiment. Appearances of "in one embodiment" or "in an embodiment" thus do not necessarily all refer to the same embodiment. Furthermore, the described features, structures, or characteristics may be combined in any suitable manner in one or more embodiments.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A system for enabling viewing of video images over a plurality of scalable modular video displays comprising:
  a) a video wallpaper subsystem including:
    at least two first video displays having a same pixel pitch and a first height and width;
    at least two second video displays having said same pixel pitch and a second height and width, wherein the second height and width is smaller than the first height and width, said second height is evenly divisible into said first height and said second width is evenly divisible into said first width;
    wherein said first video displays and said second video display are for being horizontally and vertically arrayed on a flat surface;
    each of said first video displays and second video displays including a video scaler and video mixer configured to enable video signals provided to said first video displays and second video displays to appear as one of a single video image on said displays at its native resolution and a plurality of separate video images, each at its native resolution, each of said plurality of separate video images appearing on a subset of said first and second video displays as an overlay over said single video image;
  b) a video central computer subsystem coupled to said video wallpaper subsystem, said video central computer subsystem including a video processing unit which receives video signals from a plurality of video sources and selects video signals to process and send to said video displays from said plurality of video sources, and includes a synchronizing frame buffer with time base correction to provide video synchronization of the selected video signals when said single video image and said plurality of separate video images are displayed on said video displays.

2. The system defined by claim 1 wherein one of said plurality of video sources provides an image representing a background, portions of which are displayed on each of said video displays and at least a second one of plurality of video sources provides an image representing an overlay which is displayed on at least one of said video displays, said overlay replacing portions of said background, wherein said background and said at least one overlay are displayed at their native, high resolution format.

3. The system defined by claim 1 wherein each of said video displays includes an inter-panel position adjustment to enable images displayed across multiple video displays to be aligned by adjusting said inter-panel position adjustment.

4. The system defined by claim 1 wherein said video central computer subsystem includes a plurality of said video processing units, and in a 3-dimension video environment, each of said plurality of said video processing units determines a portion of a 3-dimensional video image to process and send to at least one of said video displays.

5. The system defined by claim 1 wherein said video central computer subsystem includes a plurality of said video processing units, each of which receives predetermined color corrections to create a unitary video image which compensate for physical differences in each video image being displayed.

6. The system defined by claim 1 wherein a background image is created by use of ray tracing, including adaptive super-sampling and condensed light and optics.

7. The system defined by claim 1 wherein said video central computer subsystem includes a plurality of said video processing units, which operate to synchronize video frames so that each said video processing unit displays the video frame it is expected to display at a given time.

8. The system defined by claim 1 wherein a plurality of live video feeds are provided as said video sources to a plurality of said video processing units and each of said video processing units receives its own set of overlay images corresponding to said live video feeds using a protocol including a leader in the video central computer, time synchronization (PTP/VBL), multicasting (UDP), and replica management allowing failsafe real-time video data distribution to said video processing units.

* * * * *